United States Patent
Barut et al.

(10) Patent No.: US 12,494,200 B1
(45) Date of Patent: Dec. 9, 2025

(54) NATURAL LANGUAGE INTERACTIONS USING VISUAL UNDERSTANDING

(71) Applicant: Amazon Technologies, Inc., Seattle, WA (US)

(72) Inventors: Ahmet Emre Barut, New York, NY (US); Melanie C B Gens, Honolulu, HI (US); Matthew Cavell Johnson, Maple Valley, WA (US); Prashan Wanigasekara, Arlington, MA (US); Chengwei Su, Lexington, MA (US); Kechin Qin, Medford, MA (US); Fan Yang, Waltham, MA (US); Spurthideepika Sandiri, Holliston, MA (US)

(73) Assignee: Amazon Technologies, Inc., Seattle, WA (US)

( * ) Notice: Subject to any disclaimer, the term of this patent is extended or adjusted under 35 U.S.C. 154(b) by 391 days.

(21) Appl. No.: 18/082,742

(22) Filed: Dec. 16, 2022

Related U.S. Application Data

(60) Provisional application No. 63/418,005, filed on Oct. 20, 2022.

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 15/1815* (2013.01);
(Continued)

(58) Field of Classification Search
USPC .................. 704/235, 246, 247, 251, 252
See application file for complete search history.

(56) References Cited

U.S. PATENT DOCUMENTS

| 11,200,892 B1 * | 12/2021 | Stoops ................... G06F 3/167 |
| 11,386,901 B2 * | 7/2022 | Nishidate .............. A63F 13/215 |

(Continued)

OTHER PUBLICATIONS

Agarwal, et al. "Building goal-oriented dialogue systems with situated visual context." 2021. CoRR, abs/2111.11576.
(Continued)

*Primary Examiner* — Leonard Saint-Cyr
(74) *Attorney, Agent, or Firm* — Pierce Atwood LLP

(57) ABSTRACT

Techniques for performing an action with respect to displayed content are described. A natural language interpretation corresponding to a received spoken user input may be determined. Prior to receiving the spoken user input, content may be displayed to the user from which the spoken user input was received. The natural language interpretation may represent a request to perform an action with respect to a portion of the content currently being displayed. Content identifiers corresponding to content being displayed, may be determined, and embedding data representing at least one feature of the content may be determined using the content identifiers. The natural language interpretation and the embedding data may be processed to determine that the spoken user input relates to a first portion of the displayed content instead of a second portion of the displayed content. Based on the determination, an action responsive to the spoken user input may be performed.

20 Claims, 10 Drawing Sheets

(51) Int. Cl.
G10L 15/18 (2013.01)
G10L 15/19 (2013.01)
G10L 15/24 (2013.01)
G10L 25/57 (2013.01)
*G10L 15/30* (2013.01)

(52) U.S. Cl.
CPC .............. G10L 15/19 (2013.01); G10L 15/24 (2013.01); G10L 25/57 (2013.01); *G10L 2015/223* (2013.01); *G10L 15/30* (2013.01)

(56) References Cited

U.S. PATENT DOCUMENTS

| | | | |
|---|---|---|---|
| 12,045,288 B1* | 7/2024 | Barut | G06F 16/532 |
| 12,069,013 B1* | 8/2024 | Bell | H04L 51/046 |
| 2022/0207872 A1* | 6/2022 | Ren | G06N 3/044 |

OTHER PUBLICATIONS

Alayrac, et al. "Flamingo: a visual language model for few-shot learning." 2022. arXiv preprint arXiv:2204.14198.
Chen, et al. "A simple framework for contrastive learning of visual representations." 2020. CoRR, abs/2002.05709.
Chen, et al. "Improving long distance slot carryover in spoken dialogue systems." 2019a. arXiv preprint arXiv:1906.01149.
Chen, et al. "UNITER: learning universal image-text representations." 2019b. CoRR, abs/1909.11740.
Dosovitskiy, et al. "An image is worth 16×16 words: Transformers for image recognition at scale." 2020. CoRR, abs/2010.11929.
FitzGerald, et al. "Alexa teacher model: Pretraining and distilling multi-billionparameter encoders for natural language understanding systems." 2022. arXiv preprint arXiv:2206.07808.
Chiyah-Garcia, et al. "Exploring multi-modal representations for ambiguity detection & coreference resolution in the SIMMC 2.0 challenge." 2022. CoRR, abs/2202.12645.
Girshick, et al. "Rich feature hierarchies for accurate object detection and semantic segmentation." 2013. CoRR, abs/1311.2524.
He, et al. "Momentum contrast for unsupervised visual representation learning." 2019. CoRR, abs/1911.05722.
Hochreiter, et al. "Long short-term memory." Neural Computation, 1997. 9(8):1735-1780.
Jia, et al. "Scaling up visual and vision-language representation learning with noisy text supervision." 2021. CoRR, abs/2102.05918.
Kottur, et al. "SIMMC 2.0: A task-oriented dialog dataset for immersive multimodal conversations." In Proceedings of the 2021 Conference on Empirical Methods in Natural Language Processing, EMNLP 2021, Virtual Event/Punta Cana, Dominican Republic, Nov. 7-11, 2021, Association for Computational Linguistics. pp. 4903-4912.
Le, et al. "Multimodal dialogue state tracking." ICLR 2022 Conference Withdrawn Submission. Sep. 28, 2021.
Li, et al. "Blip: Bootstrapping language-image pretraining for unified vision-language understanding and generation." 2022. arXiv preprint arXiv:2201.12086.
Li, et al. "Align before fuse: Vision and language representation learning with momentum distillation." Advances in Neural Information Processing Systems. 2021a. 34.
Li, et al. 2020. "Oscar: Object-semantics aligned pre-training for vision-language tasks." 2020. CoRR, abs/2004.06165.
Long, et al. "Fully convolutional networks for semantic segmentation." 2014. CoRR, abs/1411.4038.
Naik, et al. "Contextual slot carryover for disparate schemas." 2018. arXiv preprint arXiv:1806.01773.
Pang, et al. "Visual dialogue state tracking for question generation." 2019. CoRR, abs/1911.07928.
Piergiovanni, et al. "Answer-me: Multi-task openvocabulary visual question answering." 2022. arXiv preprint arXiv:2205.00949.
Radford, et al. "Learning transferable visual models from natural language supervision." 2021. CoRR, abs/2103.00020.
Radford, et al. "Language models are unsupervised multitask learners." OpenAI blog, 2019. 1(8):9.
Rastogi, et al. "Scaling multidomain dialogue state tracking via query reformulation." In Proceedings of the 2019 Conference of the North American Chapter of the Association for Computational Linguistics: Human Language Technologies, vol. 2 (Industry Papers), pp. 97-105, Minneapolis, Minnesota. Association for Computational Linguistics.
Sharaf, et al. "Cross-lingual approaches to reference resolution in dialogue systems." 2018. CoRR, abs/1811.11161.
Simonyan, et al. "Two-stream convolutional networks for action recognition in videos." 2014. CoRR, abs/1406.2199.
Singh, et al. FLAVA: A foundational language and vision alignment model. 2021. CoRR, abs/2112.04482.
Tan, et al. "LXMERT: learning cross-modality encoder representations from transformers." 2019. CoRR abs/1908.07490.
Tian, et al. "Contrastive multiview coding." 2019. CoRR, abs/1906.05849.
Van den Oord, et al. "Representation learning with contrastive predictive coding." 2018. CoRR, abs/1807.03748.
Vaswani, et al. "Attention is all you need." 2017. CoRR, abs/1706.03762.
Vinyals, et al. "Show and tell: A neural image caption generator." 2014. CoRR, abs/1411.4555.
Wang, et al. "OFA: Unifying architectures, tasks, and modalities through a simple sequence-to-sequence learning framework." 2022. CoRR, abs/2202.03052.
Wang, et al. "Simvim: Simple visual language model pretraining with weak supervision." 2021. CoRR, abs/2108.10904.
Wanigasekara, et al. "Semantic vl-bert: Visual grounding via attribute learning." Amazon Science. Conference IJCNN 2022.
Yu, et al. "Coca: Contrastive captioners are image-text foundation models." 2022. arXiv preprint arXiv:2205.01917.
Yuan, et al. "Florence: A new foundation model for computer vision." 2021. CoRR, abs/2111.11432.
Zhang, et al. "Vinvl: Making visual representations matter in vision-language models." 2021. CoRR, abs/2101.00529.
Zhang, et al. "Contrastive learning of medical visual representations from paired images and text." 2020. CoRR, abs/2010.00747.

* cited by examiner

NATURAL LANGUAGE INTERACTIONS USING VISUAL UNDERSTANDING

CROSS-REFERENCE TO RELATED APPLICATION

This application claims benefit under 35 U.S.C. § 119 (e) of U.S. Provisional Patent Application No. 63/418,005, filed Oct. 20, 2022, and titled "NATURAL LANGUAGE INTERACTIONS USING VISUAL UNDERSTANDING," the contents of which are incorporated herein by reference in their entirety.

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
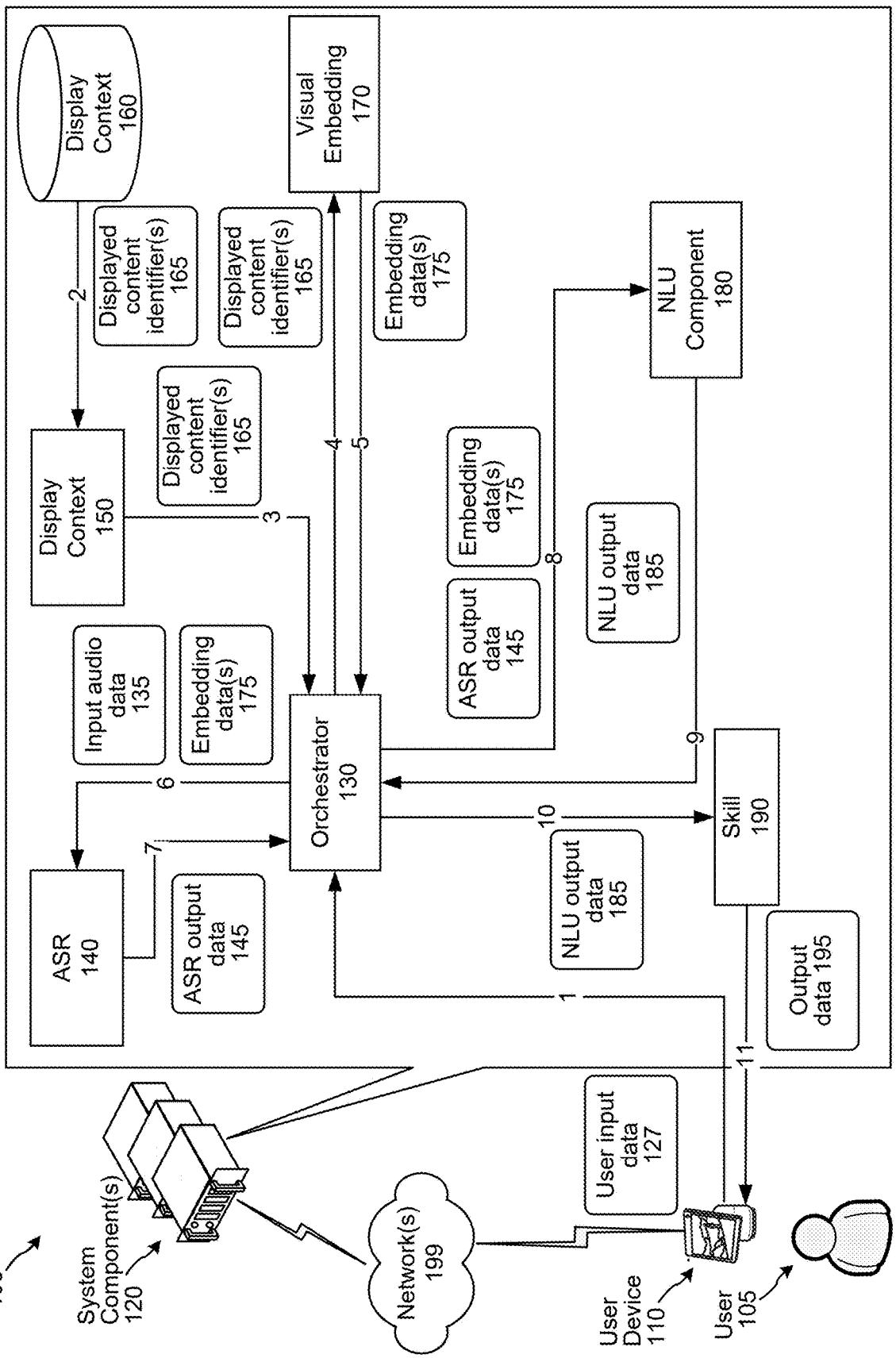
FIG. 1 is a conceptual diagram illustrating a system for performing an action responsive to a natural language user input, where the action may relate to currently and/or previously displayed content, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs), sometimes with additional contextual inputs (such as data representing something a user can see or hear). ASR and NLU are often used together as part of a language processing component of a system. Text-to-speech (TTS) is a field of computer science concerning transforming textual and/or other data into audio data that is synthesized to resemble human speech. Natural language generation (NLG) is a field of artificial intelligence concerned with automatically transforming data into natural language (e.g., English) content.

A system may output a response, to a natural language input, as displayed content and/or synthesized speech. For example, a system may display one or more images of sneakers in response to the natural language input "show me running sneakers." For further example, the system may display one or more dresses in response to the natural language input "show me dresses." As another example, the system may display one or more photos associated with a user's social media feed in response to the natural language input "show me my [social media provider name] feed." For further example, a system may display a video of a fashion show in response to the natural language input "show me this year's Fall fashion."

In some instances, a system may perform an action, in response to a natural language input, with respect to content currently being or previously displayed by a device. For example, if a device is displaying one or more images of sneakers when the system receives the user input "show me the red sneakers," the system may display (e.g., by enlarging the display of, displaying further information associated with, etc.) one or more image(s) of currently-displayed red sneakers. For further example, if a device is displaying one or more images of social media posts when the system receives the user input "zoom in on John's post," the system may display an enlarged representation of the image of "John's post." For further example, if a device previously displayed one or more images of sneakers, and the system receives a present user input of "Show me the red sneakers I was looking at yesterday," the system may display one or more image(s) of the red sneakers that had previously been displayed (e.g., within the time frame of "yesterday").

In some instances, the (currently or previously) displayed content may be a video. For example, if the system is currently displaying a video of a fashion model wearing clothes, the system may display one or more images (e.g., corresponding to one or more video frames) of the model wearing a specific outfit in response to the natural language user input "show me the one with the scarf." For further example, the system may display a portion of the video, where the model is wearing the specific outfit, in response to the natural language user input "show me just the portion with the scarf." For further example, if the system previously displayed a video (e.g., a TV show), where a character was wearing red sneakers, and the system receives a natural language user input of "show me the red sneakers worn by [character name] from the show I watched last night," the system may display one or more image(s) corresponding to the red sneakers being referenced by the natural language user input.

The present disclosure includes descriptions of techniques for utilizing (currently or previously) displayed content to understand a user input, and to perform an action responsive to the user input.

The system may cause a device to perform an action with respect to displayed content (e.g., one or more images and/or one or more videos). In some situations, the displayed content may be displayed in response to a previous user input.

The system may receive a natural language user input while the device is displaying the content or sometime after a device displayed content in the presence of a user or otherwise in association with a user profile. In situations where the user input is a spoken natural language user input, the system may perform automatic speech recognition (ASR) processing on the spoken natural language user input to determine an ASR output including a transcript of the spoken natural language user input. The ASR output may include one or more ASR hypotheses, where each ASR hypothesis may correspond to a different natural language interpretation (e.g., transcript) of the spoken natural language user input.

Prior to or at least partially in parallel to performing the ASR processing, the system may determine context data for the natural language user input, where the context data indicates at least the content currently or previously displayed to the user when the spoken natural language input was received. For example, the context data may include an image identifier(s) corresponding to an image(s), and/or a video identifier(s) corresponding to a video(s), of the content being displayed or content displayed previously to the user or otherwise in association with the user profile associated with the current user input.

The system may use the image identifier(s) and/or video identifier(s) to determine an embedding(s) representing one or more features of the image(s) and/or video(s) of the content being displayed (or previously displayed). For example, an embedding may represent that a corresponding image includes a red purse with an open zipper. For further example, an embedding may represent that a corresponding image includes a top-down view of a pair of sneakers. As another example, an embedding may represent that a corresponding image includes a human wearing a hooded jacket. As another example, an embedding may represent that a corresponding image includes open-toed shoes. As another example, an embedding may represent that a corresponding image includes a particular theme (e.g., "Christmas photos," "Fishing trip photos," "Birthday party photos," "Formal photos," etc.).

The system may use the ASR output (or one or more ASR hypotheses of the ASR output), and the embedding(s) of the displayed content, to generate an NLU output, which may represent which portion of (currently or previously) displayed content (if any) the user input is referring, and the image or video corresponding to that portion of (currently or previously) displayed content.

In situations where the system determines the user input relates to the (currently or previously) displayed content, the system may use the NLU output to cause an action to be performed with respect to the displayed content. For example, the system may determine to display (e.g., via enlargement, display of additional information, etc.) a portion (e.g., a particular image, a particular video, a particular portion of a video, etc.) of the displayed content.

A system of the present disclosure may cause a first image to be displayed. The system may store data associating the first image with a device identifier of a device. After causing the first image to be displayed, the system may receive, from the device, first input audio representing a first spoken input. The system may perform automatic speech recognition (ASR) processing using the first input audio to generate an ASR output including a transcript of the first spoken input. Based on the data associating the first image with the device identifier, and the first input audio being received from the device, the system may determine a first embedding associated with the first image, the first embedding representing at least one feature of the first image. The system may process, using a first machine learning (ML) component, the ASR output and the first embedding to determine a first similarity between the ASR output and the first embedding, where the first similarity represents a likelihood that the first spoken input is requesting performance of an action with respect to the first image. The system may determine, based on the first similarity, that the first spoken input relates to the first image. Based on determining that the first spoken input relates to the first image, the system may perform an action responsive to the first spoken input.

In some embodiments, prior to receiving the first input audio data, the system may receive, from the device, second input audio representing a second spoken input. The system may perform ASR processing using the second input audio data to generate a second ASR output including a transcript of the second spoken input. The system may perform natural language understanding (NLU) processing using the second ASR output to generate an NLU output including at least an intent corresponding to the second spoken input. Based on the NLU output, the system may determine the first image, where the first image is responsive to the second spoken input. The system may cease display of the first image, where the first input audio is received after ceasing display of the first image.

In some embodiments, the system may receive, from the device, second input audio representing a second spoken input. The system may perform ASR processing using the second input audio to generate a second ASR output including a transcript of the second spoken input. The system may determine the first embedding based on the data associating the first image and the device identifier, and the second input audio being received from the device. The system may process, using an encoder, the second ASR output to generate a second embedding representing at least one feature of the second spoken input. The system may process, using a second ML component, the first embedding and the second embedding to determine a second similarity between the first embedding and the second embedding, where the second similarity represents a likelihood that the second embedding is requesting performance of a second action with respect to the first image. The system may determine, based on the second similarity, that the second spoken input relates to the first image. Based on determining that the second spoken input relates to the first image, the system may perform an action responsive to the second spoken input.

In some embodiments, prior to receiving the first input audio data, the system may causing a second image to be displayed, where the data associating the first image with the device identifier is further stored to associate the second image with the device identifier. Based on the data associating the first image and the second image with the device identifier, and the first input audio being received from the first device, the system may determine a second embedding associated with the second image, where the second embedding represents at least one feature of the second image. The system may process, using the first ML component, the second embedding to determine a second similarity between the ASR output and the second embedding data. The system may determine, based on the first similarity and the second similarity, that the first spoken input relates to the first image instead of the second image.

The system of the present disclosure may receive representing representation of a first natural language user input. The system may determine first content that was displayed prior to receiving the representation of the first natural language user input. The system may determine a first embedding associated with the first content data, the first embedding representing at least one feature of the first content. The system may determine, using the first embedding, that the first natural language user input refers to the first content. Based on determining that the first natural language user input refers to the first content, the system may perform an action responsive to the first natural language user input.

In some embodiments, the system may receive representing representation of a second natural language user input. The system may process, using an encoder, the representation of the second natural language user input to generate a second embedding representing at least one feature of the second natural language user input. The system may process, using a machine learning (ML) component, the first embedding and the second embedding to determine a similarity between the first embedding and the second embedding, where the similarity represents a likelihood that the second embedding is requesting performance of a second action with respect to the first content. The system may determine, based on the similarity, that the second natural language user input relates to the first content. Based on determining that the second natural language user input relates to the first content, the system may perform an action responsive to the second natural language user input.

In some embodiments, the system may determine an object represented in the first content. The system may determine second content including a representation of the object. Based on the second content including a representation of the object, the system may determine that the second content is to be displayed in response to the first natural language user input.

In some embodiments, the system may determine second content that was displayed prior to receiving the representation of the first natural language user input, where the first content and the second content are determined based on data associating the first content and the second content with a device, and the first natural language user input being received from the device. The system may determine a second embedding associated with the second content, the second embedding representing at least one feature of the second content. The system may process, using a machine learning (ML) component, the representation of the first natural language user input and the first embedding to determine a first similarity. The system may process, using the ML component, the representation of the first natural language user input and the second embedding to determine a second similarity. Based on the first similarity and the second similarity, the system may determine that the first natural language user input relates to the first content instead of the second content.

In some embodiments, the system may determine the first embedding represents at least one of a color or a position of an object represented in the first content.

In some embodiment, based on determining that the first natural language user input refers to the first content instead of the second content, The system may generate a natural language understanding (NLU) output including at least a first NLU hypothesis associated with the first embedding and the second embedding.

In some embodiments, the system may determine a first automatic speech recognition (ASR) hypothesis including a first transcript of the first natural language user input. The system may process, using a machine learning (ML) component, the first ASR hypothesis and the first embedding to determine a second ASR hypothesis including a second transcript of the first natural language user input.

In some embodiments, the first content data may be video data, and the first embedding data may correspond to a first frame of the video data.

Teachings of the present disclosure provide, among other things, an improved user experience by using (currently or previously) displayed content to understand a natural language user input, as well as responding to the user input with additional displayed content.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates a system 100 for performing an action responsive to a natural language user input, where the action may relate to content being displayed to a user 105 and/or content previously displayed to the user 105. The system 100 may include a user device 110, local to the user 105, in communication with a system component(s) 120 via a network(s) 199. The network(s) 199 may include the Internet and/or any other wide- or local-area network, and may include wired, wireless, and/or cellular network hardware.

The system component(s) 120 may include various components. With reference to FIG. 1, the system component(s) 120 may include an orchestrator component 130, an automatic speech recognition (ASR) component 140, a display context component 150, a display context storage 160, a visual embedding component 170, a natural language understanding (NLU) component 180, and a skill component 190. However, the present disclosure is not intended to be limited to such a configuration. In some embodiments, the user device 110 may include or otherwise be configured to perform the herein disclosed processing of one or more of the ASR component 140, the display context component 150, the display context storage 160, the visual embedding component 170, the NLU component 180, and the skill component 190.

As illustrated in FIG. 1, the user device 110 may receive a user input, and send (at arrow 1) user input data 127 corresponding thereto to the system component(s) 120. The user input may request performance of an action. For example, the user input data 127 may represent a user input requesting performance of an action with respect to content (currently or previously) displayed to the user 105 using a display of or associated with the user device 110. For example, the user input may be "Show me the red one," "Show me the picture with the zipper open," "Show me the grey jeans from the video I watched this morning," etc.

The user input data 127 may include various types of data. For example, the user input data 127 may include input audio data when the user input is a spoken natural language input. For further example, the user input data 127 may include input text (or tokenized) data when the user input is a typed natural language user input. In the situation that the user input data 127 includes input audio data, the input audio data may correspond to spoken natural language received by one or more microphones of or associated with the user device 110.

The system component(s) 120 may receive the user input data 127 at the orchestrator component 130. The orchestrator component 130 may be configured to facilitate processing performed by the system component(s) 120. For example, the orchestrator component 130 may be configured to facilitate processing to understand a user input, as well as to perform an action responsive to the user input.

The orchestrator component 130 may query the display context component 150 for displayed content identifiers corresponding to discrete contents (currently or previously) displayed to the user 105. A displayed content identifier may be an image identifier corresponding to an image, or a video identifier corresponding to a video.

At the time the user input data 127 is received by the system component(s) 120 (or received by the user device 110), the user device 110 may be displaying/causing the display of content to the user 105. For example, the user device 110 may include a display capable of displaying content to the user 105, or the user device 110 may be in communication with another (e.g., second) device (e.g., a TV, a phone, a tablet, etc.) capable of displaying content to the user 105. In some embodiments, the user device 110 may have previously displayed content to the user 105. Prior to, or after, displaying the content to the user 105, or determining content is being displayed (or has been previously displayed) to the user 105, the system 100 may determine one or more displayed content identifiers 165 corresponding to one or more separate images (i.e., one or more instances of image data), and/or one or more video identifiers corresponding to one or more separate videos (i.e., one or more instances of video data), in the (currently or previously) displayed content. For example, the system component(s) 120 may determine that one or more images (and/or one or more videos) of shoes are to be displayed (or are being displayed) to the user 105. The system component(s) 120 may determine one or more displayed content identifiers 165 corresponding to the one or more images of shoes (or one or more frames of the video), and store the one or more displayed content identifiers 165 in the display context storage 160 in association with the user 105 (e.g., in association with a particular user profile identifier/a user identifier associated with the user 105 and/or the user device 110, in association with a dialog session identifier corresponding to the current dialog between the user 105 and the system 100, in association with a device identifier associated with the user device 110, etc.). For example, content (currently or previously) displayed for a particular user profile of the user 105 may be stored in the display context storage in association with a user profile identifier associated with the particular user profile of the user 105. The display context storage 160 may include various information associated with content (e.g., the output data 195) output to the user 105, including the one or more displayed content identifiers 165 (e.g., a URL corresponding to the image data or any other unique identifier capable of identifying the image data), a device identifier associated with the user device 110, a user identifier associated with the user 105, etc. Processing of such a prior user input requesting output of content is described in further detail herein below.

In response to receiving the foregoing query from the orchestrator component 130, the display context component 150 may query the display context storage 160 for displayed content identifiers corresponding to content (currently or previously) displayed to the user 110 when the user input was received by the user device 110 (or when the user input data 127 was sent to the orchestrator component 130). The display context component 150 may, for example, provide the display context storage 160 with one or more of a dialog session identifier corresponding to a present dialog between the user device 110 and the user 105, a user identifier corresponding to the user 105, a profile identifier corresponding to a profile associated with the user 105 and/or the user device 110, a device identifier corresponding to the user device 110, etc.

In response to the foregoing query from the display context component 150, the display context storage 160 may send (at arrow 2) one or more displayed content identifiers 165 to the display context component 150, where each of the displayed content identifier(s) 165 corresponds to different displayed content (e.g., an image or video) displayed to the user 110 when the user input was received by the user device 110 (or when the user input data 127 was sent to the orchestrator component 130). The display context component 150 may, in turn, send (at arrow 3) the displayed content identifier(s) 165 to the orchestrator component 130. In some embodiments, the displayed content identifier(s) 165 may include one or more displayed content identifiers corresponding to one or more instances of displayed content (e.g., image(s) and/or video(s)) that have previously been displayed to the user 105 during the current dialog and/or that have previously been displayed in association with a user profile associated with the user 105 and/or the user device 110.

The orchestrator component 130 may query the visual embedding component 170 for embedding data representing the displayed content to which the displayed content identifier(s) 165 correspond. For example, the orchestrator component 130 may send (at arrow 4) the displayed content identifier(s) 165 to the visual embedding component 170. In response to receiving the displayed content identifier(s) 165, the visual embedding component 170 may determine embedding data(s) 175, where an instance of the embedding data 175 represents the image data or video data of a different displayed content identifier of the displayed content identifier(s) 165. An instance of the embedding data 175 may represent one or more features associated with the corresponding image or video data (e.g., an entity (e.g., a woman, a purse, a jacket, a car, etc.), a color of an entity/object represented in the image data, a position of the entity/object (e.g., an open position, a rear viewing position, a top-down viewing position, etc.), etc.)

In some embodiments, the visual embedding component 170 may be configured to generate the embedding data(s) 175, as described herein below with respect to FIG. 2.

Figure 2:
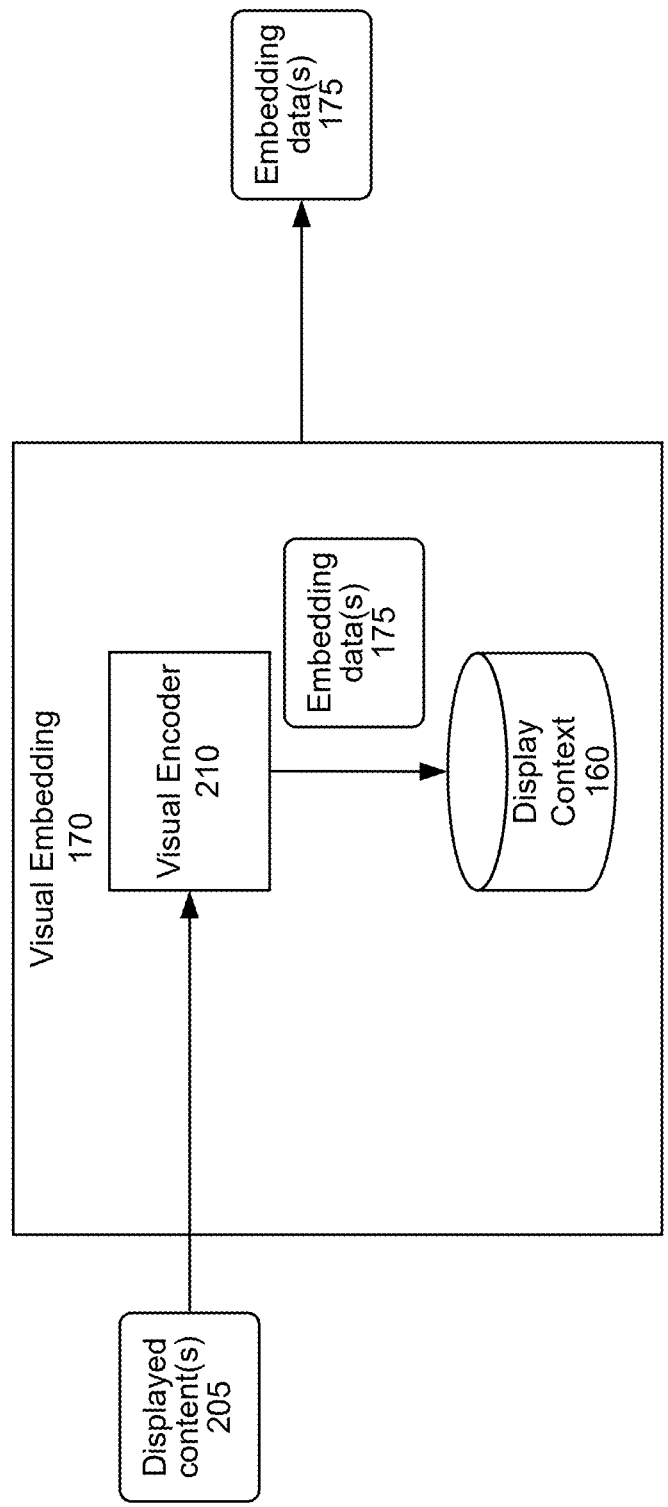
FIG. 2 is a conceptual diagram illustrating example processing performed by a visual encoder, according to embodiments of the present disclosure.

As shown in FIG. 2, the visual embedding component 170 may include a visual encoder 210, which may be configured to receive the displayed content identifier(s) 165 (or, alternatively, the corresponding displayed content(s) 205) and generate the embedding data(s) 175. In the situation where the visual embedding component 170 receives the displayed content identifier(s) 165, the visual embedding component 170 may use the displayed content identifier(s) 165 to determine the corresponding displayed content(s) 205 from a displayed content storage (not illustrated) of the system component(s) 120 or user device 110, depending on how the system 100 is configured. The displayed content(s) 205, either as received or as determined by the visual embedding component 170, may be input to the visual encoder 210, which may encode the displayed content(s) 205 (e.g., image or video data) into the embedding data(s) 175, which may represent one or more features of the displayed content(s) 205.

One skilled in the art will recognize that image or video data may be labeled/tagged with metadata representing particular features associated with the image or video data. As an example, an image of or video including a purse may be labeled/tagged with the metadata "red," "leather," and "purse." The embedding data(s) 175 may represent additional features that are not represented by the metadata. For example, the embedding data(s) 175 may further represent that the purse includes a black strap, and/or that the purse is open. In some embodiments, the visual embedding component 170 may be configured to determine the metadata associated with the image or video data, and may send it to the orchestrator component 130 with the embedding data(s) 175. In other embodiments, the metadata may be represented in/by the embedding data(s) 175.

The visual encoder 210 may generate a different instance of the embedding data 175 for each instance of displayed content 205 corresponding to the displayed content identifier(s) 165.

The embedding data 175 may correspond to one or more points in an embedding space of image or video data. The embedding space may be an N-dimensional space, where each dimension of the embedding space corresponds to a dimension (e.g., a degree of freedom) of the vector. Points in the embedding space near each other may correspond to image data that include similar features, while points far from each other may correspond to image data that correspond to dissimilar features. Regions of the embedding space may thus correspond to one or more different features of image data; a first region in the embedding space may, for example, represent a feature of the image data representing a color, while a second region in the embedding space may correspond to a feature of the image data associated with a position of an object represented in the image data.

The embedding space may be defined by processing image data including different objects with an encoder, such as a neural network encoder. First image data may, for example, be associated with features such as the color "red," the entity/object "wallet," and the position "open." The encoder may process this image data and determine output embedding data that represents the features of the image data. The point and/or region in the embedding space corresponding to the embedding data may then be associated with the features of the image data (e.g., the point may represent a red wallet that is in an open position).

In some embodiments, embedding data(s) 175 may be generated for video data. The visual encoder 210 may receive displayed content 205 representing a frame of the video data, and generate the corresponding embedding data 175. In some embodiments, after generating embedding data for each frame of the video data, the visual embedding component 170 may be configured to generate embedding data 175 including the embedding data(s) corresponding to the frames of the video data (e.g., by concatenating the embedding data(s)). In some embodiments, the frame of the video data may correspond to a frame randomly selected from the video data or a frame indicated as representing the video data (e.g., as indicated by a user).

In some embodiments, the visual encoder 210 may receive more than one displayed content 205 representing a frame of the video data. For example, the more than one displayed content 205 may represent a frame that has been sampled from the video over a period of time (e.g., sampled from the video data every 8 seconds). After generating embedding data 175 for a particular number of frames of the video data (e.g., 10 frames), the visual encoder 210 (or another component of the system component(s) 120) may generate one instance of embedding data 175 from the generated embedding datas 175. For example, the visual encoder 210 may average the embedding datas 175 corresponding to the frames of the video data to generate a single instance of embedding data 175 corresponding to the video data. For further example, the embedding datas 175 corresponding to the frames of the video data may be sent to the visual resolver component 320/natural language and visual resolver component 510 (e.g., via the visual encoder 210 sending the embedding datas 175 to the orchestrator component 130, and the orchestrator component 130 sending the embedding datas 175 to the visual resolver component 320/natural language and visual resolver component 510) along with a textual (or tokenized) description of the content of the video data. The visual resolver component 320/natural language and visual resolver component 510 may process the embedding datas 175 and the description to determine which embedding data 175 is most similar to the description, where that embedding data 175 is determined to correspond to the video data (processing of the visual resolver component 320/natural language and visual resolver component 510 to determine similarities between embedding data 175 and textual (or tokenized) input is discussed in detail herein below with respect to FIGS. 4 and 5). For further example, after determining the similarities between the embedding data 175 and the description, the embedding datas 175 may be averaged based on the similarity scores to determine the embedding data 175.

In some embodiments, the visual encoder 210 may process as described herein above to generate the single instance of embedding data 175 from the generated embedding datas 175, but the displayed content 205 may instead correspond to an image of an object included in the video data (e.g., a pair of red shoes).

In some embodiments, the visual encoder 210 may process to generate the embedding data 175 using a combination of the methods described herein above to generate embedding data 175. For example, embedding data 175 corresponding to video data may be generated from content data(s) 205 representing a random frame, a frame indicated to represent the video data, a periodically-sampled frame, and/or a product included in the video data, where the single instance of embedding data 175 may be further generated by determining an average of the generated embedding data(s) 175 corresponding to the display content(s) 205, determining embedding data 175 that is most similar to a description corresponding to the video data, and/or determining a weighted average of the embedding data(s) 175 based on their similarity to the description.

In some embodiments, the visual embedding component 170 may be configured to generate the embedding data 175 (e.g., using the visual encoder 210), for a given image or video, during offline operations (e.g., outside of normal operating hours/not during runtime operations), and store (e.g., cache) the embedding data 175 in association with the corresponding displayed content identifier 165. As such, during runtime, the visual embedding component 170 may be configured to determine pre-computed embedding data(s) 175, and send (at arrow 5) the embedding data(s) 175 to the orchestrator component 130, rather than generate the embedding data(s) 175 at runtime. In other embodiments, the visual embedding component 170 may be configured to generate the embedding data(s) 175 during runtime operations (e.g., using the visual encoder 210). For example, the visual embedding component 170 may receive (at arrow 4) a displayed content identifier 165 (or, alternatively, displayed content 205) from the orchestrator component 130, determine an instance of displayed content (e.g., image or video data) corresponding to the displayed content identifier 165, generate the corresponding embedding data(s) 175 using the visual encoder 210, and send (at arrow 5) the embedding data(s) 175 to the orchestrator component 130. For further example, at runtime the visual embedding component 170 may receive (at arrow 4) a displayed content identifier 165 and corresponding instance of displayed content (e.g., image or video data) from the orchestrator component 130, generate the corresponding embedding data(s) 175 using the visual encoder 210, and send (at arrow 5) the embedding data(s) 175 to the orchestrator component 130.

The embedding data(s) 175 generated by the visual encoder 210 may be sent to the display context storage 160 to be stored in association with the user 105 (e.g., in association with a particular user profile identifier/a user identifier associated with the user 105 and/or the user device 110, in association with a dialog session identifier corresponding to the current dialog between the user 105 and the system 100, in association with a device identifier associated with the user device 110, etc.). For example, embedding data(s) 175 generated using displayed content 205 that is/was displayed for a particular user profile of the user 105 may be stored in the display context storage 160 in association with a user profile identifier associated with the particular user profile of the user 105.

Referring again to FIG. 1, the visual embedding component 170 may send (at arrow 5) the embedding data(s) 175 to the orchestrator component 130.

The embedding data(s) 175 may allow the system 100 to determine which portion of (currently or previously) displayed content (e.g., which image or video, or frame of a video) the user 105 is referring to in situations where the user input includes an ambiguous reference to (currently or previously) displayed content. For example, the user device 110 may be displaying (or had previously displayed) multiple images, multiple videos, or at least one image and at least one video of purses and/or sports cars and/or jackets, etc. The user device 110 may receive user input data 127 requesting an action be performed with respect to a particular (currently or previously) displayed image or video. Using the embedding data(s) 175, the system 100 may determine which image or video the user 105 is referring to.

In the situation where the user input data 127 includes input audio data, the orchestrator component 130 may determine input audio data 135 included in the user input data 127, and send (at arrow 6) the input audio data 135 and the embedding data(s) 175 to the ASR component 140.

The ASR component 140 processes the input audio data 135 and generates ASR output data 145 including a transcript of the spoken natural language input of input audio data 135. For example, if the input audio data 135 corresponds to the spoken natural language input "show me the red ones," then the ASR output data 145 may include a natural language representation of "show me the red ones."

In some embodiments, the ASR output data 145 may be determined by rewriting initial ASR output data determined by the ASR component 140. ASR output data may require rewriting in situations where an error occurs in the ASR processing of a spoken natural language input, and/or where downstream processing of the ASR output data may result in an error condition. For example, ASR processing my incorrectly transcribe a spoken natural language input due to, for example, poor speech quality, extensive background noise, etc.

The system 100 may use a plurality of data search techniques to rewrite a natural language input, which is likely to cause an error or has caused an error, into a form more suitable for processing. In at least some embodiments, one or more indexes may be constructed using previous instances when natural language inputs were rewritten. The plurality of data search techniques may be run against the index(es) to generate one or more rewrite candidates. When more than one rewrite candidate is generated, the rewrite candidates may be ranked using context information. In some embodiments, the rewrite candidates may be ranked, additionally or alternatively, using the embedding data(s) 175. In at least some embodiments, NLU processing and/or an action may be performed with respect to a rewrite candidate instead of the natural language input as originally formulated by the user.

Processing of the ASR component 140 is described in further detail herein below in connection with FIG. 6. The ASR component 140 may send (at arrow 7) the ASR output data 145 to the orchestrator component 130.

The orchestrator component 130 may send (at arrow 8) the ASR output data 145 and the embedding data(s) 175 to the NLU component 180. In embodiments where the visual embedding component 170 sends metadata at arrow 5, the orchestrator component 130 may further send the metadata to the NLU component 180. The NLU component 180 may be configured to process the ASR output data 145 to generate NLU output data 185 including one or more NLU hypotheses, where each NLU hypothesis includes an intent indicator corresponding to/representing the intent of the user input of the user input data 127. In addition to an intent indicator, a NLU hypothesis may further include a domain indicator representing a domain (e.g., a shopping domain, a music domain, a navigation domain, etc.) to which the user input (of the user input data 127) corresponds. In addition to an intent indicator, a NLU hypothesis may indicate one or more entity types, where each indicated entity type corresponds to an entity value of an entity included in the user input of the user input data 127.

In some embodiments, the NLU component 180 may be further configured to process natural language data, alternative to, or in addition to, the ASR output data 145 to generate the NLU output data 185. For example, in instances where the user input data 127 includes text (or tokenized) data representing a user request, the orchestrator component 130 may be configured to send the text (or tokenized) data to the NLU component 180 to generate the NLU output data 185.

The NLU component 180 may be configured to generate the NLU output data 185 using the embedding data(s) 175, such that the NLU output data 185 may indicate a portion of (i.e., a particular instance of) (currently or previously) displayed content to which the user input data 127 is referring to. For example, if the NLU component 180 receives first embedding data 175a corresponding to a first image or video being displayed to the user 105, and second embedding data 175b corresponding to a second image or video being displayed to the user 105, then the NLU component 180 may be configured to use the first embedding data 175a and the second embedding data 175b to determine that the user input, represented by the user input data 127, requests performance (or is more likely to be requesting performance) of an action with respect to the first image or video, instead of the second image or video, and may generate the NLU output data 185 to indicate as much.

Example processing of the NLU component 180, with respect to the embedding data(s) 175, is described in detail below in connection with FIGS. 4 and 5, which illustrate how the NLU component 180 may perform NLU processing without regard to the embedding data(s) 175.

Figure 3:
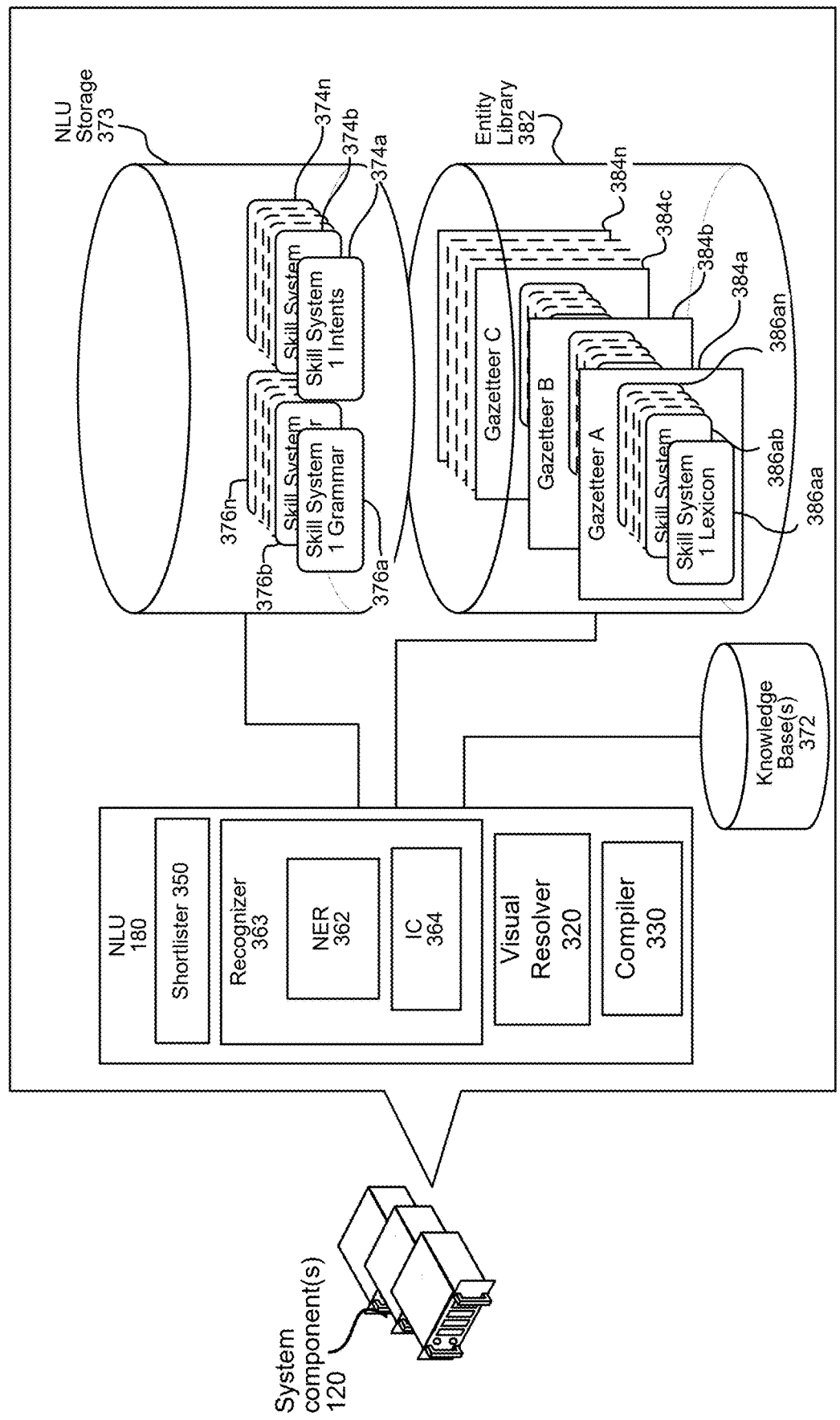
FIG. 3 is a conceptual diagram illustrating how natural language understanding (NLU) processing may be performed, according to embodiments of the present disclosure.
Figure 4:
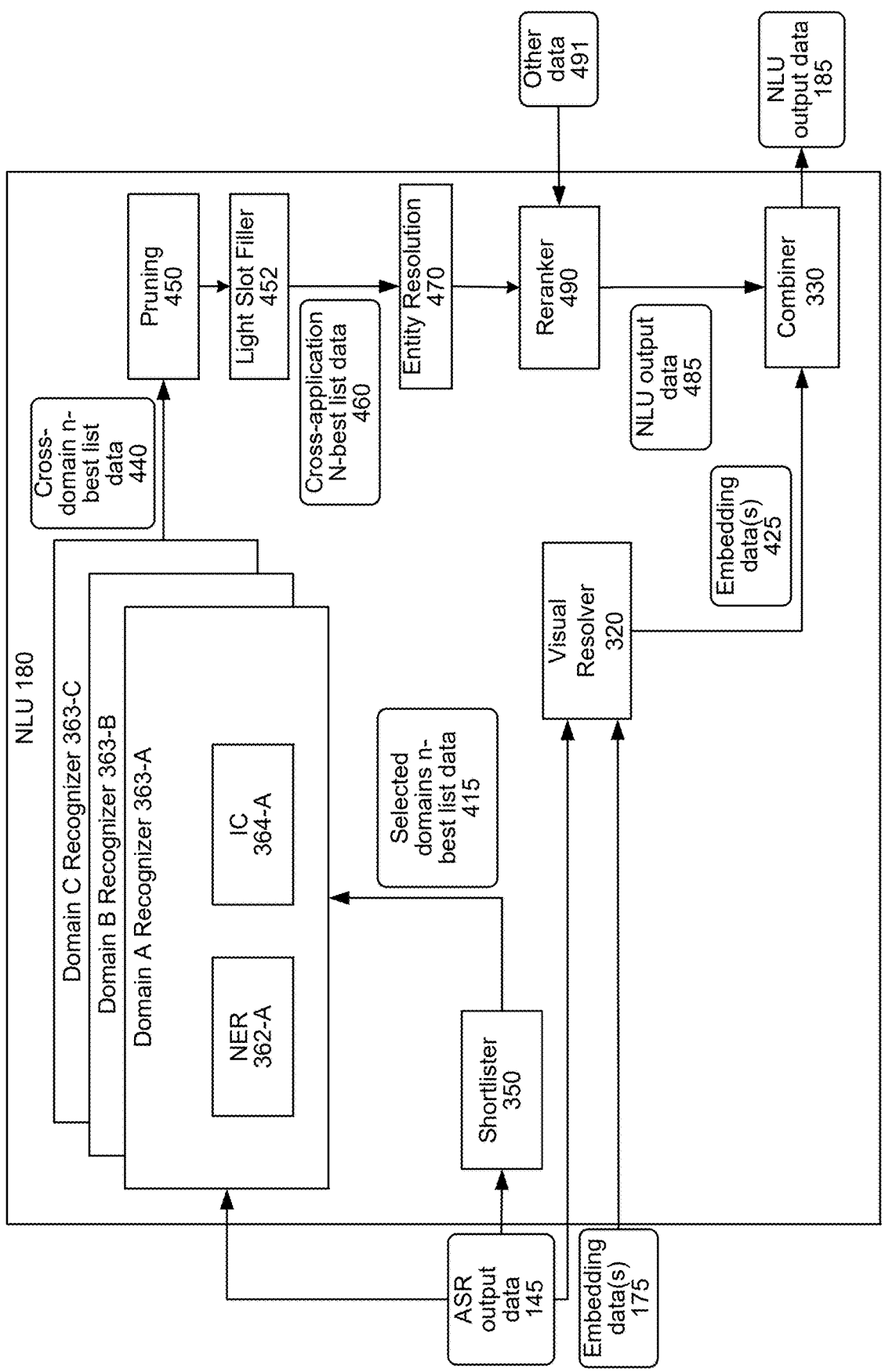
FIG. 4 is a conceptual diagram illustrating how NLU processing may utilize a visual resolver component, according to embodiments of the present disclosure.
Figure 5:
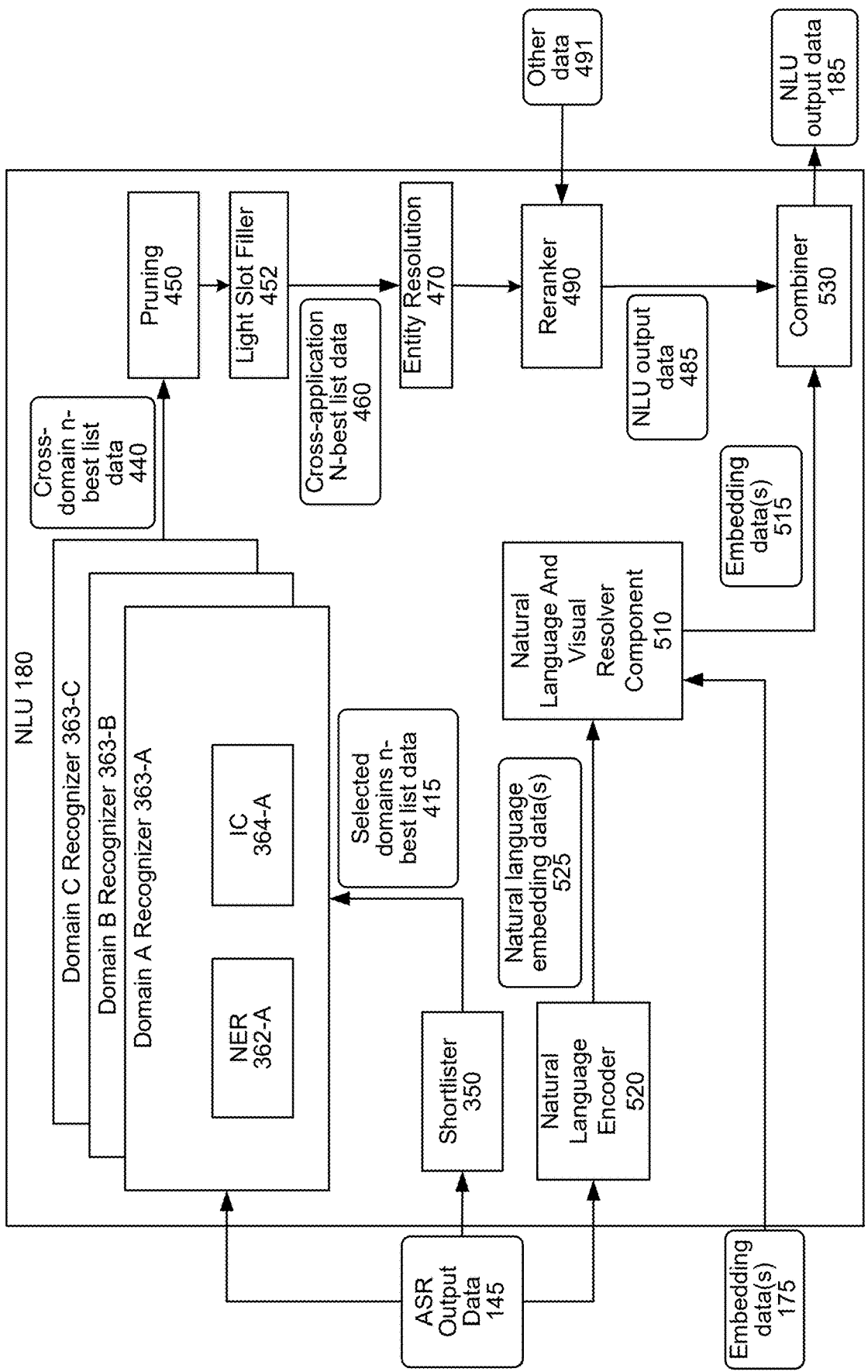
FIG. 5 is a conceptual diagram illustrating how NLU processing may utilize a natural language and visual resolver component, according to embodiments of the present disclosure.

FIGS. 3-5 illustrate how the NLU component 180 may perform NLU processing. FIG. 3 is a conceptual diagram of how natural language processing is performed, according to embodiments of the present disclosure. FIGS. 4 and 5 are conceptual diagrams of how natural language processing is performed, with respect to the embedding data(s) 175, according to embodiments of the present disclosure.

FIG. 3 illustrates how NLU processing is performed on text data. The NLU component 180 may process text data including several ASR hypotheses of a single user input. For example, if the ASR component 140 outputs text data including an n-best list of ASR hypotheses, the NLU component 180 may process the text data with respect to all (or a portion of) the ASR hypotheses represented therein.

The NLU component 180 may annotate text data by parsing and/or tagging the text data. For example, for the text data "tell me the weather for Seattle," the NLU component 180 may tag "tell me the weather for Seattle" as an <OutputWeather> intent as well as separately tag "Seattle" as a location for the weather information.

The NLU component 180 may include a shortlister component 350. The shortlister component 350 selects skills that may execute with respect to ASR output data input to the NLU component 180 (e.g., applications that may execute with respect to the user input). The ASR output data (which may also be referred to as ASR data) may include representations of text of an utterance, such as words, subword units, or the like. The shortlister component 350 thus limits downstream, more resource intensive NLU processes to being performed with respect to skills that may execute with respect to the user input.

Without a shortlister component 350, the NLU component 180 may process ASR output data input thereto with respect to every skill of the system, either in parallel, in series, or using some combination thereof. By implementing a shortlister component 350, the NLU component 180 may process ASR output data with respect to only the skills that may execute with respect to the user input. This reduces total compute power and latency attributed to NLU processing.

The shortlister component 350 may include one or more trained models. The model(s) may be trained to recognize various forms of user inputs that may be received by the system component(s) 120. For example, during a training period skill system component(s) 125 associated with a skill may provide the system component(s) 120 with training text data representing sample user inputs that may be provided by a user to invoke the skill. For example, for a ride sharing skill, a skill system component(s) 125 associated with the ride sharing skill may provide the system component(s) 120 with training text data including text corresponding to "get me a cab to [location]," "get me a ride to [location]," "book me a cab to [location]," "book me a ride to [location]," etc. The one or more trained models that will be used by the shortlister component 350 may be trained, using the training text data representing sample user inputs, to determine other potentially related user input structures that users may try to use to invoke the particular skill. During training, the system component(s) 120 may solicit the skill system component(s) 125 associated with the skill regarding whether the determined other user input structures are permissible, from the perspective of the skill system component(s) 125, to be used to invoke the skill. The alternate user input structures may be derived by one or more trained models during model training and/or may be based on user input structures provided by different skills. The skill system component(s) 125 associated with a particular skill may also provide the system component(s) 120 with training text data indicating grammar and annotations. The system component(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 350 may be trained with respect to a different skill. Alternatively, the shortlister component 350 may use one trained model per domain, such as one trained model for skills associated with a weather domain, one trained model for skills associated with a ride sharing domain, etc.

The system component(s) 120 may use the sample user inputs provided by a skill system component(s) 125, and related sample user inputs potentially determined during training, as binary examples to train a model associated with a skill associated with the skill system component(s) 125. The model associated with the particular skill may then be operated at runtime by the shortlister component 350. For example, some sample user inputs may be positive examples (e.g., user inputs that may be used to invoke the skill). Other sample user inputs may be negative examples (e.g., user inputs that may not be used to invoke the skill).

As described above, the shortlister component 350 may include a different trained model for each skill of the system, a different trained model for each domain, or some other combination of trained model(s). For example, the shortlister component 350 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 350 to output indications of only a portion of the skills that the ASR output data may relate to. For example, a user input may correspond to "tell me about Tom Collins." If the model is clustered based on domain, the shortlister component 350 may determine the user input corresponds to a recipe skill (e.g., a drink recipe) even though the user input may also correspond to an information skill (e.g., including information about a person named Tom Collins).

The NLU component 180 may include one or more recognizers 363. In at least some embodiments, a recognizer 363 may be associated with a skill system component(s) 125 (e.g., the recognizer may be configured to interpret text data to correspond to the skill system component(s) 125). In at least some other examples, a recognizer 363 may be associated with a domain such as smart home, video, music, weather, custom, etc. (e.g., the recognizer may be configured to interpret text data to correspond to the domain).

If the shortlister component 350 determines ASR output data is potentially associated with multiple domains, the recognizers 363 associated with the domains may process the ASR output data, while recognizers 363 not indicated in the shortlister component 350's output may not process the ASR output data. The "shortlisted" recognizers 363 may process the ASR output data in parallel, in series, partially in parallel, etc. For example, if ASR output data potentially relates to both a communications domain and a music domain, a recognizer associated with the communications domain may process the ASR output data in parallel, or partially in parallel, with a recognizer associated with the music domain processing the ASR output data.

Each recognizer 363 may include a named entity recognition (NER) component 362. The NER component 362 attempts to identify grammars and lexical information that may be used to construe meaning with respect to text data input therein. The NER component 362 identifies portions of text data that correspond to a named entity associated with a domain, associated with the recognizer 363 implementing the NER component 362. The NER component 362 (or other component of the NLU component 180) may also determine whether a word refers to an entity whose identity is not explicitly mentioned in the text data, for example "him," "her," "it" or other anaphora, exophora, or the like.

Each recognizer 363, and more specifically each NER component 362, may be associated with a particular grammar database 376, a particular set of intents/actions 374, and a particular personalized lexicon 386. The grammar databases 376, and intents/actions 374 may be stored in an NLU storage 373. Each gazetteer 384 may include domain/skill-indexed lexical information associated with a particular user and/or user device 110. For example, a Gazetteer A (384a) includes skill-indexed lexical information 386aa to 386an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 362 applies grammar information 376 and lexical information 386 associated with a domain (associated with the recognizer 363 implementing the NER component 362) to determine a mention of one or more entities in text data. In this manner, the NER component 362 identifies "slots" (each corresponding to one or more particular words in text data) that may be useful for later processing. The NER component 362 may also label each slot with a type (e.g., noun, place, city, artist name, song name, etc.).

Each grammar database 376 includes the names of entities (i.e., nouns) commonly found in speech about the particular domain to which the grammar database 376 relates, whereas the lexical information 386 is personalized to the user and/or the user device 110 from which the user input originated. For example, a grammar database 376 associated with a shopping domain may include a database of words commonly used when people discuss shopping.

A downstream process called entity resolution (discussed in detail elsewhere herein) links a slot of text data to a specific entity known to the system. To perform entity resolution, the NLU component 180 may utilize gazetteer information (384a-384n) stored in an entity library storage 382. The gazetteer information 384 may be used to match text data (representing a portion of the user input) with text data representing known entities, such as song titles, contact names, etc. Gazetteers 384 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 363 may also include an intent classification (IC) component 364. An IC component 364 parses text data to determine an intent(s) (associated with the domain associated with the recognizer 363 implementing the IC component 364) that potentially represents the user input. An intent represents to an action a user desires be performed. An IC component 364 may communicate with a database 374 of words linked to intents. For example, a music intent database may link words and phrases such as "quiet," "volume off," and "mute" to a <Mute> intent. An IC component 364 identifies potential intents by comparing words and phrases in text data (representing at least a portion of the user input) to the words and phrases in an intents database 374 (associated with the domain that is associated with the recognizer 363 implementing the IC component 364).

The intents identifiable by a specific IC component 364 are linked to domain-specific (i.e., the domain associated with the recognizer 363 implementing the IC component 364) grammar frameworks 376 with "slots" to be filled. Each slot of a grammar framework 376 corresponds to a portion of text data that the system believes corresponds to an entity. For example, a grammar framework 376 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386 (associated with the domain associated with the recognizer 363 implementing the NER component 362), attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as Hidden Markov Models, maximum entropy models, log linear models, conditional random fields (CRF), and the like. For example, an NER component 362 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music domain, which an IC component 364 (also implemented by the music domain recognizer) may determine corresponds to a <PlayMusic> intent. At this stage, no determination has been made as to the meaning of "mother's little helper" or "the rolling stones," but based on grammar rules and models, the NER component 362 has determined the text of these phrases relates to the grammatical object (i.e., entity) of the user input represented in the text data.

An NER component 362 may tag text data to attribute meaning thereto. For example, an NER component 362 may tag "play mother's little helper by the rolling stones" as: {domain} Music, {intent}<PlayMusic>, {artist name} rolling stones, {media type} SONG, and {song title} mother's little helper. For further example, the NER component 362 may tag "play songs by the rolling stones" as: {domain} Music, {intent}<PlayMusic>, {artist name} rolling stones, and {media type} SONG.

The shortlister component 350 may receive ASR output data 145 from the ASR component 140 or output from the user device 110b (as illustrated in FIG. 4). The ASR component 140 may embed the ASR output data 145 into a form processable by a trained model(s) using sentence embedding techniques as known in the art. Sentence embedding results in the ASR output data 145 including text in a structure that enables the trained models of the shortlister component 350 to operate on the ASR output data 145. For example, an embedding of the ASR output data 145 may be a vector representation of the ASR output data 145.

The shortlister component 350 may make binary determinations (e.g., yes or no) regarding which domains relate to the ASR output data 145. The shortlister component 350 may make such determinations using the one or more trained models described herein above. If the shortlister component 350 implements a single trained model for each domain, the shortlister component 350 may simply run the models that are associated with enabled domains as indicated in a user profile associated with the user device 110 and/or user that originated the user input.

As illustrated in FIG. 4, the shortlister component 350 may generate n-best list data 415 representing domains that may execute with respect to the user input represented in the ASR output data 145. The size of the n-best list represented in the n-best list data 415 is configurable. In an example, the n-best list data 415 may indicate every domain of the system as well as contain an indication, for each domain, regarding whether the domain is likely capable to execute the user input represented in the ASR output data 145. In another example, instead of indicating every domain of the system, the n-best list data 415 may only indicate the domains that are likely to be able to execute the user input represented in the ASR output data 145. In yet another example, the shortlister component 350 may implement thresholding such that the n-best list data 415 may indicate no more than a maximum number of domains that may execute the user input represented in the ASR output data 145. In an example, the threshold number of domains that may be represented in the n-best list data 415 is ten. In another example, the domains included in the n-best list data 415 may be limited by a threshold a score, where only domains indicating a likelihood to handle the user input is above a certain score (as determined by processing the ASR output data 145 by the shortlister component 350 relative to such domains) are included in the n-best list data 415.

The ASR output data 145 may correspond to more than one ASR hypothesis. When this occurs, the shortlister component 350 may output a different n-best list (represented in the n-best list data 415) for each ASR hypothesis. Alternatively, the shortlister component 350 may output a single n-best list representing the domains that are related to the multiple ASR hypotheses represented in the ASR output data 145.

As indicated above, the shortlister component 350 may implement thresholding such that an n-best list output therefrom may include no more than a threshold number of entries. If the ASR output data 145 includes more than one ASR hypothesis, the n-best list output by the shortlister component 350 may include no more than a threshold number of entries irrespective of the number of ASR hypotheses output by the ASR component 140. Alternatively or in addition, the n-best list output by the shortlister component 350 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 145, the shortlister component 350 may generate confidence scores representing likelihoods that domains relate to the ASR output data 145. If the shortlister component 350 implements a different trained model for each domain, the shortlister component 350 may generate a different confidence score for each individual domain trained model that is run. If the shortlister component 350 runs the models of every domain when ASR output data is received, the shortlister component 350 may generate a different confidence score for each domain of the system. If the shortlister component 350 runs the models of only the domains that are associated with skills indicated as enabled in a user profile associated with the user device 110 and/or user that originated the user input, the shortlister component 350 may only generate a different confidence score for each domain associated with at least one enabled skill. If the shortlister component 350 implements a single trained model with domain specifically trained portions, the shortlister component 350 may generate a different confidence score for each domain who's specifically trained portion is run. The shortlister component 350 may perform matrix vector modification to obtain confidence scores for all domains of the system in a single instance of processing of the ASR output data.

N-best list data 415 including confidence scores that may be output by the shortlister component 350 may be represented as, for example:

Search domain, 0.67
Recipe domain, 0.62
Information domain, 0.57
Shopping domain, 0.42

As indicated, the confidence scores output by the shortlister component 350 may be numeric values. The confidence scores output by the shortlister component 350 may alternatively be binned values (e.g., high, medium, low).

The n-best list may only include entries for domains having a confidence score satisfying (e.g., equaling or exceeding) a minimum threshold confidence score. Alternatively, the shortlister component 350 may include entries for all domains associated with user enabled skills, even if one or more of the domains are associated with confidence scores that do not satisfy the minimum threshold confidence score.

The shortlister component 350 may consider other data 420 when determining which domains may relate to the user input represented in the ASR output data 145 as well as respective confidence scores. The other data 420 may include usage history data associated with the user device 110 and/or user that originated the user input. For example, a confidence score of a domain may be increased if user inputs originated by the user device 110 and/or user routinely invoke the domain. Conversely, a confidence score of a domain may be decreased if user inputs originated by the user device 110 and/or user rarely invoke the domain. Thus, the other data 420 may include an indicator of the user associated with the ASR output data, for example as determined by a user recognition component.

The other data 420 may be character embedded prior to being input to the shortlister component 350. The other data 420 may alternatively be embedded using other techniques known in the art prior to being input to the shortlister component 350.

The other data 420 may also include data indicating the domains associated with skills that are enabled with respect to the user device 110 and/or user that originated the user input. The shortlister component 350 may use such data to determine which domain-specific trained models to run. That is, the shortlister component 350 may determine to only run the trained models associated with domains that are associated with user-enabled skills. The shortlister component 350 may alternatively use such data to alter confidence scores of domains.

As an example, considering two domains, a first domain associated with at least one enabled skill and a second domain not associated with any user-enabled skills of the user that originated the user input, the shortlister component 350 may run a first model specific to the first domain as well as a second model specific to the second domain. Alternatively, the shortlister component 350 may run a model configured to determine a score for each of the first and second domains. The shortlister component 350 may determine a same confidence score for each of the first and second domains in the first instance. The shortlister component 350 may then alter those confidence scores based on which domains is associated with at least one skill enabled by the present user. For example, the shortlister component 350 may increase the confidence score associated with the domain associated with at least one enabled skill while leaving the confidence score associated with the other domain the same. Alternatively, the shortlister component 350 may leave the confidence score associated with the domain associated with at least one enabled skill the same while decreasing the confidence score associated with the other domain. Moreover, the shortlister component 350 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 670. When the shortlister component 350 receives the ASR output data, the shortlister component 350 may determine whether profile data associated with the user and/or user device 110 that originated the command includes an indication of enabled skills.

The other data 420 may also include data indicating the type of the user device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 350 may use such data to determine which domain-specific trained models to run. For example, if the user device 110 corresponds to a displayless type device, the shortlister component 350 may determine not to run trained models specific to domains that output video data. The shortlister component 350 may alternatively use such data to alter confidence scores of domains.

As an example, considering two domains, one that outputs audio data and another that outputs video data, the shortlister component 350 may run a first model specific to the domain that generates audio data as well as a second model specific to the domain that generates video data. Alternatively, the shortlister component 350 may run a model configured to determine a score for each domain. The shortlister component 350 may determine a same confidence score for each of the domains in the first instance. The shortlister component 350 may then alter the original confidence scores based on the type of the user device 110 that originated the user input corresponding to the ASR output data. For example, if the user device 110 is a displayless device, the shortlister component 350 may increase the confidence score associated with the domain that generates audio data while leaving the confidence score associated with the domain that generates video data the same. Alternatively, if the user device 110 is a displayless device, the shortlister component 350 may leave the confidence score associated with the domain that generates audio data the same while decreasing the confidence score associated with the domain that generates video data. Moreover, if the user device 110 is a displayless device, the shortlister component 350 may increase the confidence score associated with the domain that generates audio data as well as decrease the confidence score associated with the domain that generates video data.

The type of device information represented in the other data 420 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 420 may represent the smart TV of other display device, and not the displayless device that captured the spoken user input.

The other data 420 may also include data indicating the user input originating device's speed, location, or other mobility information. For example, the device may correspond to a vehicle including a display. If the vehicle is moving, the shortlister component 350 may decrease the confidence score associated with a domain that generates video data as it may be undesirable to output video content to a user while the user is driving. The device may output data to the system component(s) 120 indicating when the device is moving.

The other data 420 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 350 may use such data to alter confidence scores of domains. For example, the shortlister component 350 may run a first model specific to a first domain as well as a second model specific to a second domain. Alternatively, the shortlister component 350 may run a model configured to determine a score for each domain. The shortlister component 350 may also determine a same confidence score for each of the domains in the first instance. The shortlister component 350 may then alter the original confidence scores based on the first domain being invoked to cause the system to output content while the current user input was received. Based on the first domain being invoked, the shortlister component 350 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 415 generated by the shortlister component 350 as well as the different types of other data 420 considered by the shortlister component 350 are configurable. For example, the shortlister component 350 may update confidence scores as more other data 420 is considered. For further example, the n-best list data 415 may exclude relevant domains if thresholding is implemented. Thus, for example, the shortlister component 350 may include an indication of a domain in the n-best list data 415 unless the shortlister component 350 is one hundred percent confident that the domain may not execute the user input represented in the ASR output data 145 (e.g., the shortlister component 350 determines a confidence score of zero for the domain).

The shortlister component 350 may send the ASR output data 145 to recognizers 363 associated with domains represented in the n-best list data 415. Alternatively, the shortlister component 350 may send the n-best list data 415 or some other indicator of the selected subset of domains to another component (such as the orchestrator component 130) which may in turn send the ASR output data 145 to the recognizers 363 corresponding to the domains included in the n-best list data 415 or otherwise indicated in the indicator. If the shortlister component 350 generates an n-best list representing domains without any associated confidence scores, the shortlister component 350/orchestrator component 130 may send the ASR output data 145 to recognizers 363 associated with domains that the shortlister component 350 determines may execute the user input. If the shortlister component 350 generates an n-best list representing domains with associated confidence scores, the shortlister component 350/orchestrator component 130 may send the ASR output data 145 to recognizers 363 associated with domains associated with confidence scores satisfying (e.g., meeting or exceeding) a threshold minimum confidence score.

A recognizer 363 may output tagged text data generated by an NER component 362 and an IC component 364, as described herein above. The NLU component 180 may compile the output tagged text data of the recognizers 363 into a single cross-domain n-best list 440 and may send the cross-domain n-best list 440 to a pruning component 450. Each entry of tagged text (e.g., each NLU hypothesis) represented in the cross-domain n-best list data 440 may be associated with a respective score indicating a likelihood that the NLU hypothesis corresponds to the domain associated with the recognizer 363 from which the NLU hypothesis was output. For example, the cross-domain n-best list data 440 may be represented as (with each line corresponding to a different NLU hypothesis):

[0.95] Intent: <PlayMusic> ArtistName: Beethoven SongName: Waldstein Sonata

[0.70] Intent: <Play Video> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 450 may sort the NLU hypotheses represented in the cross-domain n-best list data 440 according to their respective scores. The pruning component 450 may perform score thresholding with respect to the cross-domain NLU hypotheses. For example, the pruning component 450 may select NLU hypotheses associated with scores satisfying (e.g., meeting and/or exceeding) a threshold score. The pruning component 450 may also or alternatively perform number of NLU hypothesis thresholding. For example, the pruning component 450 may select the top scoring NLU hypothesis(es). The pruning component 450 may output a portion of the NLU hypotheses input thereto. The purpose of the pruning component 450 is to create a reduced list of NLU hypotheses so that downstream, more resource intensive, processes may only operate on the NLU hypotheses that most likely represent the user's intent.

The NLU component 180 may include a light slot filler component 452. The light slot filler component 452 can take text from slots represented in the NLU hypotheses output by the pruning component 450 and alter them to make the text more easily processed by downstream components. The light slot filler component 452 may perform low latency operations that do not involve heavy operations such as reference to a knowledge base (e.g., 372. The purpose of the light slot filler component 452 is to replace words with other words or values that may be more easily understood by downstream components. For example, if a NLU hypothesis includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-domain n-best list data 460.

The cross-domain n-best list data 460 may be input to an entity resolution component 470. The entity resolution component 470 can apply rules or other instructions to standardize labels or tokens from previous stages into an intent/slot representation. The precise transformation may depend on the domain. For example, for a travel domain, the entity resolution component 470 may transform text corresponding to "Boston airport" to the standard BOS three-letter code referring to the airport. The entity resolution component 470 can refer to a knowledge base (e.g., 372) that is used to specifically identify the precise entity referred to in each slot of each NLU hypothesis represented in the cross-domain n-best list data 460. Specific intent/slot combinations may also be tied to a particular source, which may then be used to resolve the text. In the example "play songs by the stones," the entity resolution component 470 may reference a personal music catalog, Amazon Music account, a user profile, or the like. The entity resolution component 470 may output an altered n-best list that is based on the cross-domain n-best list 460 but that includes more detailed information (e.g., entity IDs) about the specific entities mentioned in the slots and/or more detailed slot data that can eventually be used by a skill. The NLU component 180 may include multiple entity resolution components 470 and each entity resolution component 470 may be specific to one or more domains.

The NLU component 180 may include a reranker component 490. The reranker component 490 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 470.

The reranker component 490 may apply re-scoring, biasing, or other techniques. The reranker component 490 may consider not only the data output by the entity resolution component 470, but may also consider other data 491. The other data 491 may include a variety of information. For example, the other data 491 may include skill rating or popularity data. For example, if one skill has a high rating, the reranker component 490 may increase the score of a NLU hypothesis that may be processed by the skill. The other data 491 may also include information about skills that have been enabled by the user that originated the user input. For example, the reranker component 490 may assign higher scores to NLU hypothesis that may be processed by enabled skills than NLU hypothesis that may be processed by non-enabled skills. The other data 491 may also include data indicating user usage history, such as if the user that originated the user input regularly uses a particular skill or does so at particular times of day. The other data 491 may additionally include data indicating date, time, location, weather, type of user device 110, user identifier, context, as well as other information. For example, the reranker component 490 may consider when any particular skill is currently active (e.g., music being played, a game being played, etc.).

As illustrated and described, the entity resolution component 470 is implemented prior to the reranker component 490. The entity resolution component 470 may alternatively be implemented after the reranker component 490. Implementing the entity resolution component 470 after the reranker component 490 limits the NLU hypotheses processed by the entity resolution component 470 to only those hypotheses that successfully pass through the reranker component 490.

The reranker component 490 may be a global reranker (e.g., one that is not specific to any particular domain). Alternatively, the NLU component 180 may implement one or more domain-specific rerankers. Each domain-specific reranker may rerank NLU hypotheses associated with the domain. Each domain-specific reranker may output an n-best list of reranked hypotheses (e.g., 5-10 hypotheses).

FIG. 4 further illustrates how NLU processing may utilize a visual resolver component to generate the NLU output data 185. As further illustrated in FIG. 4, the NLU component 180 may further include a visual resolver component 320 and a combiner component 330.

In addition to the processing described above, the NLU component 180 may receive the embedding data(s) 175, and may use the embedding data(s) 175 to generate the NLU output data 185. For example, the NLU component 180 may generate the NLU output data 185 based on a similarity between (1) a representation of one or more images of content (currently or previously) displayed, and (2) the ASR output data 145 (or one or more ASR hypotheses of the ASR output data 145).

The visual resolver component 320 may take as input the ASR output data 145 and the embedding data(s) 175, and determine embedding data(s) 425. The embedding data(s) 425 may include one or more instances of the embedding data(s) 175 corresponding to one or more images that are likely referred to in the user input data 127. For example, the visual resolver component 320 may be configured to determine a similarity between the ASR output data 145 and the embedding data(s) 175. In other words, the visual resolver component 320 may be configured to determine whether one or more instances of the embedding data 175 are similar to the natural language interpretation of the user input data 127, as represented by the ASR output data 145. For example, the visual resolver component 320 may determine whether the similarity between an instance of embedding data 175 and the ASR output data 145 (e.g., a top-ranked ASR hypothesis) meets and/or exceeds a threshold similarity. In some embodiments, the visual resolver component 320 may be configured to determine whether one or more instances of the embedding data 175 are similar to the one or more natural language interpretations of the user input data 127, as represented by the ASR output data 145 (e.g., the one or more ASR hypotheses of the ASR output data 145). For example, the visual resolver component 320 may determine whether the similarity between an instance of embedding data 175 and each ASR hypothesis of the ASR output data 145 satisfies (e.g., meets and/or exceeds) a threshold similarity.

The visual resolver component 320 may output (as the embedding data(s) 425) one or more instances of embedding data 175 determined to be similar to one or more ASR hypotheses of the ASR output data 145. For example, if a first ASR hypothesis represents "show me the picture of the red purse with the open zipper," then the visual resolver component 320 may determine that a first instance of embedding data 175a representing an image of a red purse with an open zipper is similar to the first ASR hypothesis. The visual resolver component 320 may output an indication that the first embedding data 175a is similar to the first ASR hypothesis. For further example, if a second ASR hypothesis represents "show me the picture of the red purse with the closed zipper," then the visual resolver component 320 may determine that a second instance of embedding data 175b representing an image of a red purse with a closed zipper is similar to the second ASR hypothesis. The visual resolver component 320 may further output (as included in the embedding data(s) 425) an indication that the second embedding data 175b is similar to the second ASR hypothesis.

In some embodiments, the visual resolver component 320 may determine more than one instance of embedding data 175 is similar to the ASR output data 145 (or a single ASR hypothesis therein). In such embodiments, the visual resolver component 320 may rank the more than one instances of embedding data 175 based on their level of similarity to the ASR output data 145 (or the single ASR hypothesis), and may output a ranked list of the more than one instance of embedding data 175 for the ASR output data 145 (or the single ASR hypothesis) (e.g., as the embedding data(s) 425).

In some embodiments, the visual resolver component 320 may be a ML model. For example, the ML model may be trained to take as input natural language data and one or more embeddings representing one or more images, and output a ranked list of one or more of the embeddings determined to be similar (e.g., determined to satisfy a threshold similarity) to the natural language data. During training, the ML model may receive a training pair including natural language data and one or more embedded representations of image data (e.g., determined by the visual encoder 210), and may be tasked with determining if the embedded representations are similar to the natural language data. In some embodiments, the ML model may be trained to recognize features represented by the embedding data, such that the ML model may determine a similarity between the features represented by the embedding data and natural language data (e.g., the ASR output data 145 and/or an ASR hypothesis). In some embodiments, during training, natural language data including sensitive information (e.g., information related to a protected class such as race, religion, etc.) may be filtered out of the training data set used to train the ML model such that the resulting ML model is unable to process natural language data including sensitive information.

As discussed herein above, in some embodiments, the visual resolver component 320 may be unable to process natural language data including sensitive information. When the visual resolver component 320 is so configured, the visual resolver component 320 may be configured to output an error condition (e.g., a NULL value) in response to processing user input data 127 including sensitive information. For example, if the ASR output data 145 (or one or more of the ASR hypotheses) corresponds to an interpretation of the user input data 127 that includes sensitive information, the visual resolver component 320 may output the error condition for the processing performed with respect to the ASR output data 145 (or the corresponding ASR hypothesis).

The visual resolver component 320 may send the embedding data(s) 425 to the combiner component 330. The combiner component 330 may also receive the NLU output data 485 from the reranker component 490. As discussed above the NLU output data 485 may include one or more NLU hypotheses. The combiner component 330 may be configured to generate NLU output data 185 including the NLU output data 485 and displayed content identifier(s) associated with the image data(s) and/or video data(s) to which the embedding data(s) 425 correspond. In some embodiments, the displayed content identifier(s) may be associated with each NLU hypothesis of the NLU output data 485. In some embodiments, the visual resolver component 320 may be configured to, after determining the embedding data(s) 425, determine the displayed content identifier(s) corresponding thereto, and send the displayed content identifier(s) to the combiner component 330. The combiner component 330 may send the NLU output data 185 to the orchestrator component 130.

FIG. 5 illustrates how NLU processing may utilize a natural language and visual resolver component to generate the NLU output data 185. As illustrated in FIG. 5, and in addition to the disclosure, of FIGS. 3 and 4, the NLU component 180 may include a natural language and visual resolver component 510, a natural language encoder 520, and a combiner component 530.

In addition to the processing described in connection with FIGS. 3 and 4, the NLU component 180 may use the embedding data(s) 175 and natural language embedding data 525, representing an embedding representation of the ASR output data 145, to generate the NLU output data 185. For example, the NLU component 180 may generate the NLU output data 185 based on (1) an embedded representation of the content (currently or previously) displayed, and (2) an embedded representation of the textual (or tokenized) representation of the user input data 127.

The ASR output data 145 may be received at the natural language encoder 520. In some embodiments, the natural language encoder 520 may be included in the natural language and visual resolver component 510. The natural language encoder 520 may be configured to encode the ASR output data 145, and generate the natural language embedding data 525. In some embodiments, where the orchestrator component 130 sends metadata associated with the image data(s) and/or video data(s) (or represented in the embedding data(s) 175), the natural language encoder 520 may further be configured to encode the metadata (or representation of the metadata). The natural language embedding data 525 may represent one or more features (e.g., an entity (e.g., a woman, a purse, a jacket, a car, etc.) described in the ASR output data 145, a color of an entity/object described in the ASR output data 145, a position of the entity/object (e.g., an open position, a rear viewing position, a top-down viewing position, etc.), etc.) associated with the corresponding ASR output data 145 (or other natural language data sent to the NLU component 180 from the orchestrator component 130).

The natural language encoder 520 may generate a different instance of the natural language embedding data 525 for each ASR hypothesis included in the ASR output data 145.

In some embodiments, the natural language encoder 520 may be trained together with the visual encoder 210. In other words, the natural language encoder 520 may be configured to encode the ASR output data 145 into natural language embedding data 525 that corresponds to one or more points in the same embedding space as the visual encoder 210.

The natural language encoder 520 may send the natural language embedding data 525 to the text and visual resolver component 510. The natural language and visual resolver component 510 may also receive the embedding data(s) 175, and may use the natural language embedding data(s) 525 and the embedding data(s) 175 to determine embedding data(s) 515. The embedding data(s) 515 may include one or more instances of embedding data 175 representing one or more images and/or videos that are likely being referred to by the user input data 127, as represented by the natural language embedding data 525. For example, the natural language and visual resolver component 510 may be configured to determine a dot product similarity between each instance of the natural language embedding data(s) 525 and each instance of the embedding data(s) 175 to determine the embedding data(s) 515 including one or more instances of embedding data(s) 175 that have a particular level of similarity to the natural language embedding data(s) 525. In some embodiments, the natural language embedding data(s) 525 may correspond to a top-ranked ASR hypothesis included in the ASR output data 145.

Similar to the visual resolver component 320, the natural language and visual resolver component 510 may output one or more instances of embedding data 175 determined to be similar to the natural language embedding data(s) 525 (e.g., as the embedding data(s) 515).

Further, similar to the visual resolver component 320, the natural language and visual resolver component 510 may determine more than one instance of embedding data 175 is similar to the natural language embedding data(s) 525. In such embodiments, the natural language and visual resolver component 510 may rank the more than one instance of embedding data 175 based on their similarity, and may output a ranked list of the more than one instance of embedding data 175 (e.g., as the embedding data(s) 515).

In contrast to the visual resolver component 320, the natural language and visual resolver component 510 may be configured to process multi-modal input (e.g., the embedded representation of the image data(s) and/or video data(s) and the embedded representation of the user input (e.g., the ASR output data 145, or any other natural language data associated with the user input)).

In some embodiments, the natural language and visual resolver component 510 may determine the embedding data(s) 515 (e.g., the one or more instances of embedding data 175 similar to the natural language embedding data(s) 525) using a ML model. For example, the ML model may be trained to take as input at least two embedded representations, and output a similarity between the at least two embedded representations. During training, the ML model may receive an embedded representation of image or video data and an embedded representation of text (or tokenized) data associated with the image or video data, and may be tasked with determining how similar the embedded representation of image or video data and the embedded representation of the text (or tokenized) data are. In some embodiments, the ML model may be trained to recognize features represented by the embedding representations, such that the ML model may determine a similarity between the features represented by the embedded representation of image or video data and the features represented by the embedded representation of text (or tokenized) data.

Similar to the visual resolver component 320, in some embodiments, during training, natural language data including sensitive information (e.g., information related to a protected class such as race, religion, etc.) may be filtered out of the training data set used to train the ML model such that the resulting ML model is unable to process natural language data including sensitive information. In such embodiments, the natural language and visual resolver component 510 may be configured to output an error condition (e.g., a NULL value) in response to processing user input data 127 including sensitive information, as discussed above with respect to the visual resolver component 320.

The natural language and visual resolver component 510 may send the embedding data(s) 515 to the combiner component 530. The combiner component 530 may also receive NLU output data 485 from the reranker component 490. As discussed above, the NLU output data 485 may include one or more NLU hypotheses. The combiner component 530 may be configured to generate the NLU output data 185, which may include the NLU output data 485 and displayed content identifier(s) associated with the image data(s) and/or video data(s) to which the embedding data(s) 515 correspond. In some embodiments, the displayed content identifier(s) may be associated with each NLU hypothesis of the NLU output data 485. In some embodiments, the natural language and visual resolver component 510 may be configured to, after determining the embedding data(s) 515, determine the displayed content identifier(s) corresponding thereto, and send the displayed content identifier(s) to the combiner component 530. Alternatively, or additionally, in some embodiments, the combiner component 530 may generate the NLU output data 185 to include the metadata associated with the image data(s) and/or the video data(s) to which the embedding data(s) 515 correspond. As discussed above, in some embodiments, the natural language and visual resolver component 510 may be configured to, after determining the embedding data(s) 515, determine the corresponding metadata, and send the metadata to the combiner component 530. The combiner component 530 may send the NLU output data 185 to the orchestrator component 130.

Although the embedding data(s) 175 are shown as being input to the visual resolver component 320 and the natural language and visual resolver model 510 (see FIGS. 4 and 5), the embedding data(s) 175 may be utilized by any model to perform its respective processing, for example those shown in FIGS. 4 and 5. For example, the shortlister component 350 may use the embedding data(s) 175 to determine the selected domains n-best list data 415, the NER component 362 may use the embedding data(s) 175 to determine named entities included in the ASR output data 145, the IC component 364 may use the embedding data(s) 175 determine intent(s) that potentially represents the user input, the entity resolution component 470 may use the embedding data(s) 175 to determine a slot of text data to a specific entity known to the system 100, and/or the reranker component 490 may use the embedding data(s) 175 to assign a particular confidence score to each NLU hypothesis input therein.

Referring again to FIG. 1, the NLU component 180 may send (at arrow 9) the NLU output data 185 to the orchestrator component 130 which may, in turn, send (at arrow 10) the NLU output data 185 (or top-scoring NLU hypothesis thereof when the NLU output data 185 includes more than one NLU hypothesis) to the skill component 190 corresponding to the NLU output data 185 (or top-scoring NLU hypothesis thereof). In some embodiments, based on the NLU output data 185 including the displayed content identifier(s), the orchestrator component 130 may only route the NLU output data 185 to skill component(s) 180 that are capable of processing with respect to such configured NLU output data.

The skill component 190 may be configured to generate output data 195 responsive to the user input data 127, based on the received NLU output data 185 (or top-scoring NLU hypothesis thereof). For example, if the NLU output data 185 (or top-scoring NLU hypothesis thereof) indicates that the user input data 127 requests that "the picture of the wallet with the zipper open" be selected, then the output data 195 may include image data including the image of the wallet with the zipper open. For further example, if the NLU output data 185 (or top-scoring NLU hypothesis thereof) indicates that the user input data 127 requests that "the rear view picture of the hooded jacket" be selected, then the output data 195 may include image data including the image of the rear view of the hooded jacket. For further example, if the NLU output data 185 (or top-scoring NLU hypothesis thereof) indicates that the user input data 127 requests "show me the red sneakers worn by [character name] from the show I watched last night", then the output data 195 may include image data including the image of the corresponding red sneakers.

The skill component 190 may determine image or video data, corresponding to an image or video indicated by the NLU output data 185, based on the displayed content identifier(s) included in the NLU output data 185. For example, the skill component 190 may determine that the NLU output data 185 indicates that the user input data 127 requests that "the wallet with the zipper open" be selected, and the NLU output data 185 may further indicate that a particular instance(s) of image and/or video data, represented by a displayed content identifier(s) included in the NLU output data 185, corresponds to "the wallet with the zipper open." The skill component 190 may use the displayed content identifier(s) to determine the corresponding image or video data.

In some embodiments, the skill component 190 may be configured to determine related image or video data associated with the image or video data to which the embedding data(s) 175 corresponds. For example, the NLU output data 185 may indicate, via the NLU hypotheses and the displayed content identifier(s), that an action be performed with respect to an image or video of a fashion model wearing a jacket, jeans, and boots, which is currently being (or was previously) presented. The skill component 190 may be further configured to determine one or more images and/or one or more videos corresponding to objects (e.g., the jacket, the jeans, and/or the boots) that are included in the image or video currently being (or was previously) presented. The skill component 190 may determine the related image and/or video data, for example, based on metadata associated with the image or video data to which the displayed content identifier(s) corresponds (e.g., the metadata included in the NLU output data 185, or metadata associated with the image(s) and/or video(s) indicated by the NLU output data 185). For example, the metadata may represent a hierarchical structure of related image and/or video data, based on features (e.g., objects) included in the image or video data. Based on the determining an action is to be performed with respect to the image or video of the fashion model, and the skill component 190 determining one or more images and/or one or more videos corresponding to objects included in the image or video of the fashion model (e.g., using the metadata associated with the image or video), the skill component 190 may determine to output the one or more images and/or one or more videos corresponding to the objects as well.

In some embodiments, the system 100 may be configured to determine the (currently or previously) displayed content, referred to in a user input, when the displayed content corresponds to one or more scenes (e.g., one or more frames) in a video. For example, if the user device 110 (or a device associated with the user device 110) is currently (or was previously) displaying video content to the user 105, and the user input data 127 represents "show me the scene with them wearing the denim jacket" or "show me the scene from the video last night with [character name] wearing the denim jacket" then the system 100 may be configured to generate output data 195 including image data representing the scene (e.g., the image data corresponding to the frame of the video) with the denim jacket. In such embodiments, the embedding data(s) 175 may correspond to one or more frames of the video content. In some embodiments, the system 100 may determine that the user input data 127 refers to more than one frame of video content. In such embodiments, the system 100 may be configured to generate output data including video data representing the more than one frame of the video content, and/or may generate the output data to include image data including multiple images each corresponding to a different frame of the video content.

In some embodiments, the user input data 127 may correspond to a request to perform an action with respect to at least a portion of content that was displayed in response to a previous request. For example, prior to receiving the user input data 127, the system component(s) 120 may receive second user input data representing a user input requesting output of content (e.g., "Show me summer dresses."). The ASR component 140 may determine ASR output data representing a transcript of the second user input data. The NLU component 180 may use the ASR output data to determine NLU output data including at least an intent corresponding to the second user input data. The skill component 190 may use the NLU output data to determine output data including one or more images to be output to the user 105 (e.g., images of dresses).

After determining the output data, the skill component 190 may determine one or more displayed content identifier(s) 165 corresponding to the one or more images included in the output data, and may send the displayed content identifier(s) 165 to the display context storage 160 to be stored in association with the user 105 (e.g., using a user identifier for the user 105) and/or the user device 110 (e.g., using a device identifier for the user device 110).

Figure 6:
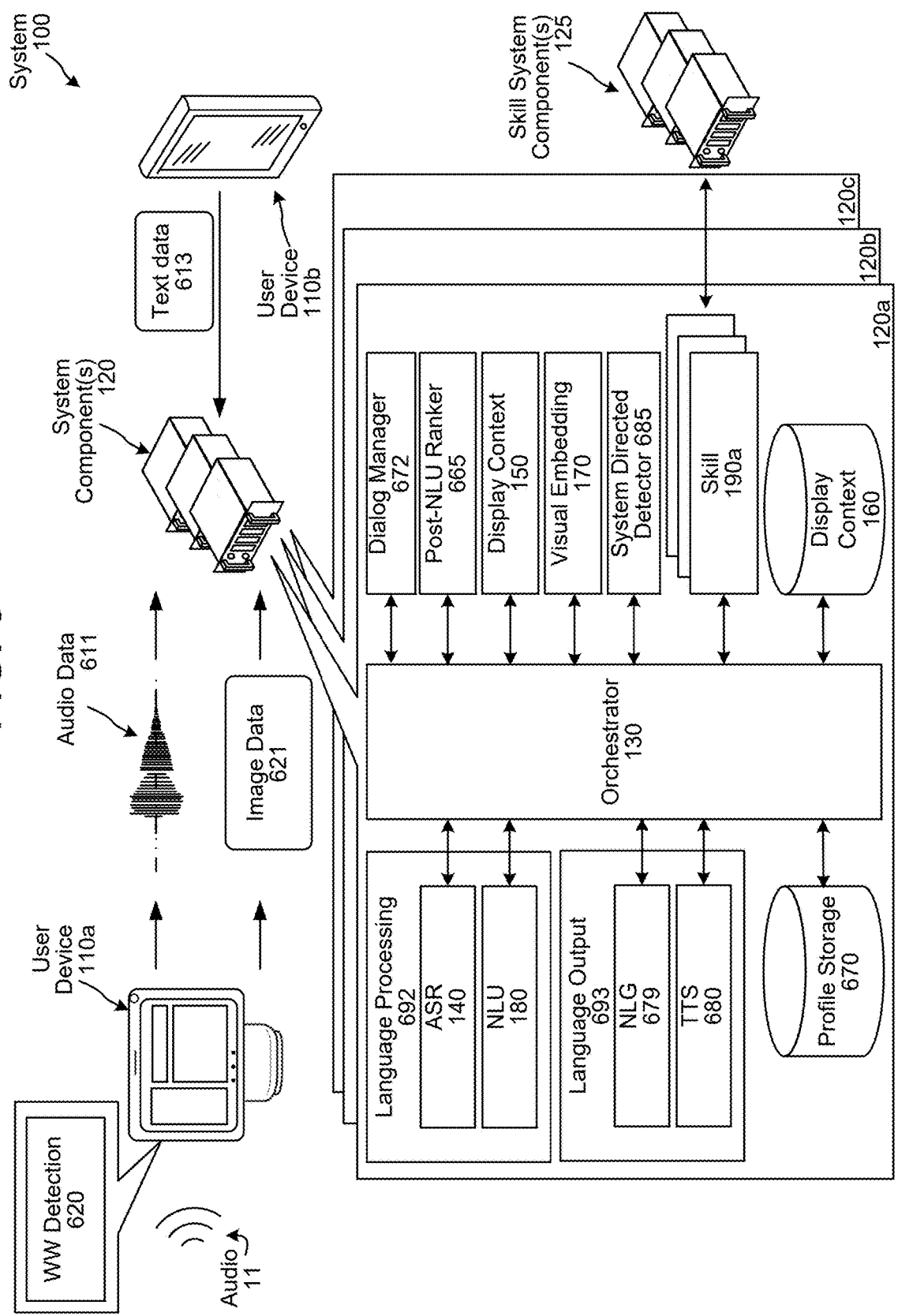
FIG. 6 is a conceptual diagram of components of the system, according to embodiments of the present disclosure.

The system 100 may operate using various components as described in FIG. 6. The various components may be located on same or different physical devices. Communication between various components may occur directly or across a network(s) 199. The user device 110a may include audio capture component(s), such as a microphone or array of microphones of a user device 110, captures audio 11 and creates corresponding audio data. Once speech is detected in audio data representing the audio 11, the user device 110a may determine if the speech is directed at the user device 110/system component(s) 120. In at least some embodiments, such determination may be made using a wakeword detection component 620. The wakeword detection component 620 may be configured to detect various wakewords. In at least some examples, each wakeword may correspond to a name of a different digital assistant. An example wakeword/digital assistant name is "Alexa." In another example, input to the system may be in form of text data 613, for example as a result of a user typing an input into a user interface of user device 110b. Other input forms may include indication that the user has pressed a physical or virtual button on user device 110b, the user has made a gesture, etc. The user device 110a may also capture images using camera(s) 818 of the user device 110a and may send image data 621 representing those image(s) to the system component(s) 120. The image data 621 may include raw image data or image data processed by the device 110a before sending to the system component(s) 120. The image data 621 may be used in various manners by different components of the system to perform operations such as determining whether a user is directing an utterance to the system, interpreting a user command, responding to a user command, etc.

The wakeword detection component 620 of the user device 110 may process the audio data, representing the audio 11, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 620 may compare audio data to stored data to detect a wakeword. One approach for wakeword detection applies general large vocabulary continuous speech recognition (LVCSR) systems to decode audio signals, with wakeword searching being conducted in the resulting lattices or confu-sion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 620 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 620 and/or input is detected by an input detector, the user device 110 may "wake" and begin transmitting audio data 611, representing the audio 11, to the system component(s) 120. The audio data 611 may include data corresponding to the wakeword; in other embodiments, the portion of the audio corresponding to the wakeword is removed by the user device 110 prior to sending the audio data 611 to the system component(s) 120. In the case of touch input detection or gesture based input detection, the audio data may not include a wakeword.

In some implementations, the system 100 may include more than one system component(s) 120. The system components 120 may respond to different wakewords and/or perform different categories of tasks. Each system component(s) 120 may be associated with its own wakeword such that speaking a certain wakeword results in audio data be sent to and processed by a particular system. For example, detection of the wakeword "Alexa" by the wakeword detection component 620 may result in sending audio data to system component(s) 120*a* for processing while detection of the wakeword "Computer" by the wakeword detector may result in sending audio data to system component(s) 120*b* for processing. The system may have a separate wakeword and system for different skills/systems (e.g., "Dungeon Master" for a game play skill/system component(s) 120*c*) and/or such skills/systems may be coordinated by one or more skill component(s) 190 of one or more system components 120.

The user device 110 may also include a system directed input detector 785. (The system component(s) 120 may also include a system directed input detector 685 which may operate in a manner similar to system directed input detector 785.) The system directed input detector 785 may be configured to determine whether an input to the system (for example speech, a gesture, etc.) is directed to the system or not directed to the system (for example directed to another user, etc.). The system directed input detector 785 may work in conjunction with the wakeword detection component 620. If the system directed input detector 785 determines an input is directed to the system, the user device 110 may "wake" and begin sending captured data for further processing. If data is being processed the user device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 785 determines an input is not directed to the system (such as a speech or gesture directed to another user) the user device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 785 is determining whether an input is potentially device directed. For example, the system may output an orange indicator while considering an input, and may output a green indicator if a system directed input is detected. Other such configurations are possible. Further details regarding the system directed input detector 785 are included below with regard to FIG. 6.

Upon receipt by the system component(s) 120, the audio data 611 may be sent to an orchestrator component 130. The orchestrator component 130 may include memory and logic that enables the orchestrator component 130 to transmit various pieces and forms of data to various components of the system, as well as perform other operations as described herein.

The orchestrator component 130 may send the audio data 611 to a language processing component 692. The language processing component 692 (sometimes also referred to as a spoken language understanding (SLU) component) includes an automatic speech recognition (ASR) component 140 and a natural language understanding (NLU) component 180. The ASR component 140 may transcribe the audio data 611 into text data. The text data output by the ASR component 140 represents one or more than one (e.g., in the form of an N-best list) ASR hypotheses representing speech represented in the audio data 611. The ASR component 140 interprets the speech in the audio data 611 based on a similarity between the audio data 611 and pre-established language models. For example, the ASR component 140 may compare the audio data 611 with models for sounds (e.g., acoustic units such as phonemes, senons, phones, etc.) and sequences of sounds to identify words that match the sequence of sounds of the speech represented in the audio data 611. The ASR component 140 sends the text data generated thereby to an NLU component 180, via, in some embodiments, the orchestrator component 130. The text data sent from the ASR component 140 to the NLU component 180 may include a single top-scoring ASR hypothesis or may include an N-best list including multiple top-scoring ASR hypotheses. An N-best list may additionally include a respective score associated with each ASR hypothesis represented therein.

The language processing system 692 may further include a NLU component 180. The NLU component 180 may receive the text data from the ASR component. The NLU component 180 may attempts to make a semantic interpretation of the phrase(s) or statement(s) represented in the text data input therein by determining one or more meanings associated with the phrase(s) or statement(s) represented in the text data. The NLU component 180 may determine an intent representing an action that a user desires be performed and may determine information that allows a device (e.g., the user device 110, the system component(s) 120, a skill component 190, a skill system component(s) 125, etc.) to execute the intent. For example, if the text data corresponds to "play the 5th Symphony by Beethoven," the NLU component 180 may determine an intent that the system output music and may identify "Beethoven" as an artist/composer and "5th Symphony" as the piece of music to be played. For further example, if the text data corresponds to "what is the weather," the NLU component 180 may determine an intent that the system output weather information associated with a geographic location of the user device 110. In another example, if the text data corresponds to "turn off the lights," the NLU component 180 may determine an intent that the system turn off lights associated with the user device 110 or the user 5. However, if the NLU component 180 is unable to resolve the entity—for example, because the entity is referred to by anaphora such as "this song" or "my next appointment"—the speech language system 692 can send a decode request to another language processing system 692 for information regarding the entity mention and/or other context related to the utterance. The language processing system 692 may augment, correct, or base results data upon the audio data 611 as well as any data received from the other language processing system 692.

The NLU component 180 may return NLU output data 185 (which may include tagged text data, indicators of intent, etc.) back to the orchestrator component 130. The orchestrator component 130 may forward the NLU results data to a skill component(s) 190. If the NLU results data includes a single NLU hypothesis, the NLU component 180 and the orchestrator component 130 may direct the NLU output data to the skill component(s) 190 associated with the NLU hypothesis. If the NLU output data 185 includes an N-best list of NLU hypotheses, the NLU component 180 and the orchestrator component 130 may direct the top scoring NLU hypothesis to a skill component(s) 190 associated with the top scoring NLU hypothesis. The system may also include a post-NLU ranker 665 which may incorporate other information to rank potential interpretations determined by the NLU component 180. The local user device 110 may also include its own post-NLU ranker 765, which may operate similarly to the post-NLU ranker 665. The NLU component 180, post-NLU ranker 665 and other components are described in greater detail below with regard to FIGS. 3 and 4.

A skill component may be software running on the system component(s) 120 that is akin to a software application. That is, a skill component 190 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 190. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 190 may operate in conjunction between the system component(s) 120 and other devices, such as the user device 110, in order to complete certain functions. Inputs to a skill component 190 may come from speech processing interactions or through other interactions or input sources. A skill component 190 may include hardware, software, firmware, or the like that may be dedicated to a particular skill component 190 or shared among different skill components 190.

A skill support system(s) 125 may communicate with a skill component(s) 190 within the system component(s) 120 and/or directly with the orchestrator component 130 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system component(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 190 dedicated to interacting with the skill support system(s) 125. Unless expressly stated otherwise, reference to a skill, skill device, or skill component may include a skill component 190 operated by the system component(s) 120 and/or skill operated by the skill support system(s) 125. Moreover, the functionality described herein as a skill or skill may be referred to using many different terms, such as an action, bot, app, or the like. The skill component 190 and or skill support system(s) 125 may return output data to the orchestrator component 130.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 100 may include a dialog manager component 672 that manages and/or tracks a dialog between a user and a device. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 672 may associate a dialog session identifier with the dialog upon identifying that the user is engaging in a dialog with the user. The dialog manager component 672 may track a user input and the corresponding system generated response to the user input as a turn. The dialog session identifier may correspond to multiple turns of user input and corresponding system generated response. The dialog manager component 672 may transmit data identified by the dialog session identifier directly to the orchestrator component 130 or other component. Depending on system configuration the dialog manager component 672 may determine the appropriate system generated response to give to a particular utterance or user input of a turn. Or creation of the system generated response may be managed by another component of the system (e.g., the language output component 693, NLG 679, orchestrator component 130, etc.) while the dialog manager component 672 selects the appropriate responses. Alternatively, another component of the system component(s) 120 may select responses using techniques discussed herein. The text of a system generated response may be sent to a TTS component 680 for creation of audio data corresponding to the response. The audio data may then be sent to a user device (e.g., user device 110) for ultimate output to the user. Alternatively (or in addition) a dialog response may be returned in text or some other form.

The dialog manager component 672 may receive the ASR hypothesis/hypotheses (i.e., text data) and make a semantic interpretation of the phrase(s) or statement(s) represented therein. That is, the dialog manager component 672 determines one or more meanings associated with the phrase(s) or statement(s) represented in the text data based on words represented in the text data. The dialog manager component 672 determines a goal corresponding to an action that a user desires be performed as well as pieces of the text data that allow a device (e.g., the user device 110, the system component(s) 120, a skill component 190, a skill system component(s) 125, etc.) to execute the intent. If, for example, the text data corresponds to "what is the weather," the dialog manager component 672 may determine that that the system component(s) 120 is to output weather information associated with a geographic location of the user device 110. In another example, if the text data corresponds to "turn off the lights," the dialog manager component 672 may determine that the system component(s) 120 is to turn off lights associated with the device(s) 110 or the user(s) 5.

The dialog manager component 672 may send the results data to one or more skill(s) 190. If the results data includes a single hypothesis, the orchestrator component 130 may send the results data to the skill(s) 190 associated with the hypothesis. If the results data includes an N-best list of hypotheses, the orchestrator component 130 may send the top scoring hypothesis to a skill(s) 190 associated with the top scoring hypothesis.

The system component(s) 120 includes a language output component 693. The language output component 693 includes a natural language generation (NLG) component 679 and a text-to-speech (TTS) component 680. The NLG component 679 can generate text for purposes of TTS output to a user. For example the NLG component 679 may generate text corresponding to instructions corresponding to a particular action for the user to perform. The NLG component 679 may generate appropriate text for various outputs as described herein. The NLG component 679 may include one or more trained models configured to output text appropriate for a particular input. The text output by the NLG component 679 may become input for the TTS component 680 (e.g., output text data discussed below). Alternatively or in addition, the TTS component 680 may receive text data from a skill component 190 or other system component for output.

The NLG component 679 may include a trained model. The NLG component 679 generates text data from dialog data received by the dialog manager component 672 such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the TTS component 680.

The TTS component 680 may generate audio data (e.g., synthesized speech) from text data using one or more different methods. Text data input to the TTS component 680 may come from a skill component 190, the orchestrator component 130, or another component of the system. In one method of synthesis called unit selection, the TTS component 680 matches text data against a database of recorded speech. The TTS component 680 selects matching units of recorded speech and concatenates the units together to form audio data. In another method of synthesis called parametric synthesis, the TTS component 680 varies parameters such as frequency, volume, and noise to create audio data including an artificial speech waveform. Parametric synthesis uses a computerized voice generator, sometimes called a vocoder.

The user device 110 may include still image and/or video capture components such as a camera or cameras to capture one or more images. The user device 110 may include circuitry for digitizing the images and/or video for transmission to the system component(s) 120 as image data. The user device 110 may further include circuitry for voice command-based control of the camera, allowing a user 5 to request capture of image or video data. The user device 110 may process the commands locally or send audio data 611 representing the commands to the system component(s) 120 for processing, after which the system component(s) 120 may return output data that can cause the user device 110 to engage its camera.

The system component(s) 120 may include a user recognition component that recognizes one or more users using a variety of data. However, the disclosure is not limited thereto, and the user device 110 may include a user recognition component instead of and/or in addition to user recognition component of the system component(s) 120 without departing from the disclosure.

The user-recognition component may take as input the audio data 611 and/or text data output by the ASR component 140. The user-recognition component may perform user recognition by comparing audio characteristics in the audio data 611 to stored audio characteristics of users. The user-recognition component 695 may also perform user recognition by comparing biometric data (e.g., fingerprint data, iris data, etc.), received by the system in correlation with the present user input, to stored biometric data of users assuming user permission and previous authorization. The user-recognition component may further perform user recognition by comparing image data (e.g., including a representation of at least a feature of a user), received by the system in correlation with the present user input, with stored image data including representations of features of different users. The user-recognition component may perform additional user recognition processes, including those known in the art.

The user-recognition component determines scores indicating whether user input originated from a particular user. For example, a first score may indicate a likelihood that the user input originated from a first user, a second score may indicate a likelihood that the user input originated from a second user, etc. The user-recognition component also determines an overall confidence regarding the accuracy of user recognition operations.

Output of the user-recognition component may include a single user identifier corresponding to the most likely user that originated the user input. Alternatively, output of the user-recognition component may include an N-best list of user identifiers with respective scores indicating likelihoods of respective users originating the user input. The output of the user-recognition component may be used to inform NLU processing as well as processing performed by other components of the system.

The system 100 (either on user device 110, system component(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 670 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component(s) 120 with permission to allow the skill to execute with respect to the user's natural language user inputs. If a user does not enable a skill, the system component(s) 120 may not invoke the skill to execute with respect to the user's natural language user inputs.

The profile storage 670 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 670 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 7:
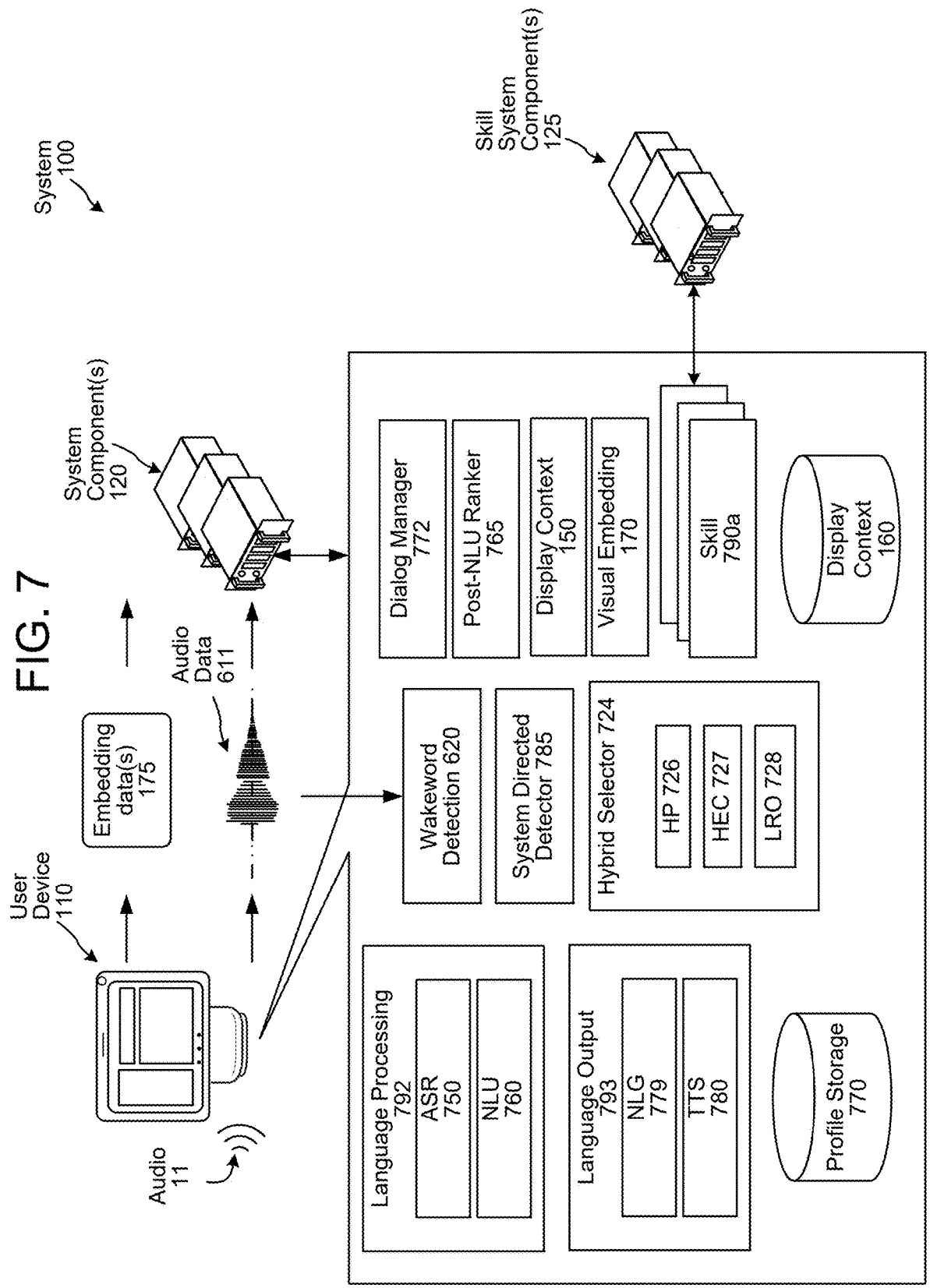
FIG. 7 is a conceptual diagram illustrating components that may be included in a device, according to embodiments of the present disclosure.

Although the components of FIG. 6 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure. FIG. 7 illustrates such a configured user device 110.

In at least some embodiments, the system component(s) 120 may receive the audio data 611 from the user device 110, to recognize speech corresponding to a spoken input in the received audio data 611, and to perform functions in response to the recognized speech. In at least some embodiments, these functions involve sending directives (e.g., commands), from the system component(s) 120 to the user device 110 (and/or other user device 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) 120 over the network(s) 199, some or all of the functions capable of being performed by the system component(s) 120 may be performed by sending one or more directives over the network(s) 199 to the user device 110, which, in turn, may process the directive(s) and perform one or more corresponding actions. For example, the system component(s) 120, using a remote directive that is included in response data (e.g., a remote response), may instruct the user device 110 to output an audible response (e.g., using TTS processing performed by an on-device TTS component 780) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 6, the user device 110 may include a wakeword detection component 620 configured to compare the audio data 611 to stored models used to detect a wakeword (e.g., "Alexa") that indicates to the user device 110 that the audio data 611 is to be processed for determining NLU output data (e.g., slot data that corresponds to a named entity, label data, and/or intent data, etc.). In at least some embodiments, a hybrid selector 724, of the user device 110, may send the audio data 611 to the wakeword detection component 620. If the wakeword detection component 620 detects a wakeword in the audio data 611, the wakeword detection component 620 may send an indication of such detection to the hybrid selector 724. In response to receiving the indication, the hybrid selector 724 may send the audio data 611 to the system component(s) 120 and/or the ASR component 750. The wakeword detection component 620 may also send an indication, to the hybrid selector 724, representing a wakeword was not detected. In response to receiving such an indication, the hybrid selector 724 may refrain from sending the audio data 611 to the system component(s) 120, and may prevent the ASR component 750 from further processing the audio data 611. In this situation, the audio data 611 can be discarded.

The user device 110 may conduct its own speech processing using on-device language processing components, such as an SLU/language processing component 792 (which may include an ASR component 750 and an NLU component 760), similar to the manner discussed herein with respect to the SLU component 692 (or ASR component 140 and the NLU component 180) of the system component(s) 120. Language processing component 792 may operate similarly to language processing component 692, ASR component 750 may operate similarly to ASR component 140 and NLU component 760 may operate similarly to NLU component 180. The user device 110 may also internally include, or otherwise have access to, other components such as one or more skill components 790 capable of executing commands based on NLU output data or other results determined by the user device 110/system component(s) 120 (which may operate similarly to skill components 190), a user recognition component (configured to process in a similar manner to that discussed herein with respect to the user recognition component of the system component(s) 120), profile storage 770 (configured to store similar profile data to that discussed herein with respect to the profile storage 670 of the system component(s) 120), or other components. In at least some embodiments, the profile storage 770 may only store profile data for a user or group of users specifically associated with the user device 110. Similar to as described above with respect to skill component 190, a skill component 790 may communicate with a skill system component(s) 125. The user device 110 may also have its own language output component 793 which may include NLG component 779 and TTS component 780. Language output component 793 may operate similarly to language output component 693, NLG component 779 may operate similarly to NLG component 679 and TTS component 780 may operate similarly to TTS component 680.

As shown in FIG. 7, the user device 110 may further include the display context component 150, the display context storage 160, and/or the visual embedding component 170. As such, the user device 110 may be able perform at least some of the abovementioned processing with respect to those components. In some embodiments, the user device 110 may be configured to generate/determine the embedding data(s) 175, and may send the embedding data(s) 175 to the system component(s) 120 to perform further processing and/or storage of the embedding data(s) 175.

In at least some embodiments, the on-device language processing components may not have the same capabilities as the language processing components of the system component(s) 120. For example, the on-device language processing components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 120. If the user device 110 attempts to process a natural language user input for which the on-device language processing components are not necessarily best suited, the language processing results determined by the user device 110 may indicate a low confidence or other metric indicating that the processing by the user device 110 may not be as accurate as the processing done by the system component(s) 120.

The hybrid selector 724, of the user device 110, may include a hybrid proxy (HP) 726 configured to proxy traffic to/from the system component(s) 120. For example, the HP 726 may be configured to send messages to/from a hybrid execution controller (HEC) 727 of the hybrid selector 724. For example, command/directive data received from the system component(s) 120 can be sent to the HEC 727 using the HP 726. The HP 726 may also be configured to allow the audio data 611 to pass to the system component(s) 120 while also receiving (e.g., intercepting) this audio data 611 and sending the audio data 611 to the HEC 727.

In at least some embodiments, the hybrid selector 724 may further include a local request orchestrator (LRO) 728 configured to notify the ASR component 750 about the availability of new audio data 611 that represents user speech, and to otherwise initiate the operations of local language processing when new audio data 611 becomes available. In general, the hybrid selector 724 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 110 receives directive data from the system component(s) 120 and chooses to use that remotely-determined directive data.

Thus, when the audio data 611 is received, the HP 726 may allow the audio data 611 to pass through to the system component(s) 120 and the HP 726 may also input the audio data 611 to the on-device ASR component 750 by routing the audio data 611 through the HEC 727 of the hybrid selector 724, whereby the LRO 728 notifies the ASR component 750 of the audio data 611. At this point, the hybrid selector 724 may wait for response data from either or both of the system component(s) 120 or the local language processing components. However, the disclosure is not limited thereto, and in some examples the hybrid selector 724 may send the audio data 611 only to the local ASR component 750 without departing from the disclosure. For example, the user device 110 may process the audio data 611 locally without sending the audio data 611 to the system component(s) 120.

The local ASR component 750 is configured to receive the audio data 611 from the hybrid selector 724, and to recognize speech in the audio data 611, and the local NLU component 760 is configured to determine a user intent from the recognized speech, and to determine how to act on the user intent by generating NLU output data which may include directive data (e.g., instructing a component to perform an action). Such NLU output data may take a form similar to that as determined by the NLU component 180 of the system component(s) 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 760) may be selected as usable to respond to a natural language user input, and local response data may be sent (e.g., local NLU output data, local knowledge base information, internet search results, and/or local directive data) to the hybrid selector 724, such as a "ReadyToExecute" response. The hybrid selector 724 may then determine whether to use directive data from the on-device components to respond to the natural language user input, to use directive data received from the system component(s) 120, assuming a remote response is even received (e.g., when the user device 110 is able to access the system component(s) 120 over the network(s) 199), or to determine output audio requesting additional information from the user 5.

The user device 110 and/or the system component(s) 120 may associate a unique identifier with each natural language user input. The user device 110 may include the unique identifier when sending the audio data 611 to the system component(s) 120, and the response data from the system component(s) 120 may include the unique identifier to identify which natural language user input the response data corresponds.

In at least some embodiments, the user device 110 may include, or be configured to use, one or more skill components 790 that may work similarly to the skill component(s) 190 implemented by the system component(s) 120. The skill component(s) 790 may correspond to one or more domains that are used in order to determine how to act on a spoken input in a particular way, such as by outputting a directive that corresponds to the determined intent, and which can be processed to implement the desired operation. The skill component(s) 790 installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 110 may be in communication with one or more skill system components 125. For example, a skill system component(s) 125 may be located in a remote environment (e.g., separate location) such that the user device 110 may only communicate with the skill system component(s) 125 via the network(s) 199. However, the disclosure is not limited thereto. For example, in at least some embodiments, a skill system component(s) 125 may be configured in a local environment (e.g., home server and/or the like) such that the user device 110 may communicate with the skill system component(s) 125 via a private network, such as a local area network (LAN).

As used herein, a "skill" may refer to a skill component 790, a skill system component(s) 125, or a combination of a skill component 790 and a corresponding skill system component(s) 125.

Similar to the manner discussed with regard to FIG. 6, the local user device 110 may be configured to recognize multiple different wakewords and/or perform different categories of tasks depending on the wakeword. Such different wakewords may invoke different processing components of local user device 110 (not illustrated in FIG. 7). For example, detection of the wakeword "Alexa" by the wakeword detection component 620 may result in sending audio data to certain language processing components 792/skills 790 for processing while detection of the wakeword "Computer" by the wakeword detector may result in sending audio data different language processing components 792/skills 790 for processing.

The NLU component 180 may perform NLU processing described above with respect to domains associated with skills wholly implemented as part of the system component(s) 120 (e.g., designated 190 in FIG. 6). The NLU component 180 may separately perform NLU processing described above with respect to domains associated with skills that are at least partially implemented as part of the skill system component(s) 125. In an example, the shortlister component 350 may only process with respect to these latter domains. Results of these two NLU processing paths may be merged into NLU output data 185, which may be sent to a post-NLU ranker 665, which may be implemented by the system component(s) 120.

The post-NLU ranker 665 may include a statistical component that produces a ranked list of intent/skill pairs with associated confidence scores. Each confidence score may indicate an adequacy of the skill's execution of the intent with respect to NLU results data associated with the skill. The post-NLU ranker 665 may operate one or more trained models configured to process the NLU output data 185, skill result data 430, and the other data 420 in order to output ranked output data. The ranked output data may include an n-best list where the NLU hypotheses in the NLU output data 185 are reordered such that the n-best list in the ranked output data represents a prioritized list of skills to respond to a user input as determined by the post-NLU ranker 665. The ranked output data may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 665 enables the system to better determine the best skill to execute the user input. For example, first and second NLU hypotheses in the NLU output data 185 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 665 (or other scheduling component such as orchestrator component 130) may solicit the first skill component and the second skill component to provide potential result data 430 based on the first NLU hypothesis and the second NLU hypothesis, respectively. For example, the post-NLU ranker 665 may send the first NLU hypothesis to the first skill component 190*a* along with a request for the first skill component 190*a* to at least partially execute with respect to the first NLU hypothesis. The post-NLU ranker 665 may also send the second NLU hypothesis to the second skill component 190*b* along with a request for the second skill 190*b* to at least partially execute with respect to the second NLU hypothesis. The post-NLU ranker 665 receives, from the first skill component 190*a*, first result data 430*a* generated from the first skill 190*a*'s execution with respect to the first NLU hypothesis. The post-NLU ranker 665 also receives, from the second skill component 190*b*, second results data 430*b* generated from the second skill component 190*b*'s execution with respect to the second NLU hypothesis.

The result data 430 may include various portions. For example, the result data 430 may include content (e.g., audio data, text data, and/or video data) to be output to a user. The result data 430 may also include a unique identifier used by the system component(s) 120 and/or the skill system component(s) 125 to locate the data to be output to a user. The result data 430 may also include an instruction. For example, if the user input corresponds to "turn on the light," the result data 430 may include an instruction causing the system to turn on a light associated with a profile of the device (110*a*/110*b*) and/or user.

The post-NLU ranker 665 may consider the first result data 430*a* and the second result data 430*b* to alter the first confidence score and the second confidence score of the first NLU hypothesis and the second NLU hypothesis, respectively. That is, the post-NLU ranker 665 may generate a third confidence score based on the first result data 430*a* and the first confidence score. The third confidence score may correspond to how likely the post-NLU ranker 665 determines the first skill will correctly respond to the user input. The post-NLU ranker 665 may also generate a fourth confidence score based on the second result data 430*b* and the second confidence score. One skilled in the art will appreciate that a first difference between the third confidence score and the fourth confidence score may be greater than a second difference between the first confidence score and the second confidence score. The post-NLU ranker 665 may also consider the other data 420 to generate the third confidence score and the fourth confidence score. While it has been described that the post-NLU ranker 665 may alter the confidence scores associated with first and second NLU hypotheses, one skilled in the art will appreciate that the post-NLU ranker 665 may alter the confidence scores of more than two NLU hypotheses. The post-NLU ranker 665 may select the result data 430 associated with the skill component 190 with the highest altered confidence score to be the data output in response to the current user input. The post-NLU ranker 665 may also consider the ASR output data to alter the NLU hypotheses confidence scores.

The orchestrator component 130 may, prior to sending the NLU output data 185 to the post-NLU ranker 665, associate intents in the NLU hypotheses with skill components 190. For example, if a NLU hypothesis includes a <PlayMusic> intent, the orchestrator component 130 may associate the NLU hypothesis with one or more skill components 190 that can execute the <PlayMusic> intent. Thus, the orchestrator component 130 may send the NLU output data 185, including NLU hypotheses paired with skill components 190, to the post-NLU ranker 665. In response to ASR output data corresponding to "what should I do for dinner today," the orchestrator component 130 may generates pairs of skill components 190 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 665 queries each skill component 190, paired with a NLU hypothesis in the NLU output data 185, to provide result data 430 based on the NLU hypothesis with which it is associated. That is, with respect to each skill, the post-NLU ranker 665 colloquially asks the each skill "if given this NLU hypothesis, what would you do with it." According to the above example, the post-NLU ranker 665 may send skill components 190 the following data:

Skill 1: First NLU hypothesis including <Help> intent indicator

Skill 2: Second NLU hypothesis including <Order> intent indicator

Skill 3: Third NLU hypothesis including <DishType> intent indicator

The post-NLU ranker 665 may query each of the skill components 190 in parallel or substantially in parallel.

A skill component 190 may provide the post-NLU ranker 665 with various data and indications in response to the post-NLU ranker 665 soliciting the skill component 190 for result data 430. A skill component 190 may simply provide the post-NLU ranker 665 with an indication of whether or not the skill can execute with respect to the NLU hypothesis it received. A skill component 190 may also or alternatively provide the post-NLU ranker 665 with output data generated based on the NLU hypothesis it received. In some situations, a skill component 190 may need further information in addition to what is represented in the received NLU hypothesis to provide output data responsive to the user input. In these situations, the skill component 190 may provide the post-NLU ranker 665 with result data 430 indicating slots of a framework that the skill component 190 further needs filled or entities that the skill component 190 further needs resolved prior to the skill component 190 being able to provided result data 430 responsive to the user input. The skill component 190 may also provide the post-NLU ranker 665 with an instruction and/or computer-generated speech indicating how the skill component 190 recommends the system solicit further information needed by the skill component 190. The skill component 190 may further provide the post-NLU ranker 665 with an indication of whether the skill component 190 will have all needed information after the user provides additional information a single time, or whether the skill component 190 will need the user to provide various kinds of additional information prior to the skill component 190 having all needed information. According to the above example, skill components 190 may provide the post-NLU ranker 665 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <Dish Type> intent indicator Result data 430 includes an indication provided by a skill component 190 indicating whether or not the skill component 190 can execute with respect to a NLU hypothesis; data generated by a skill component 190 based on a NLU hypothesis; as well as an indication provided by a skill component 190 indicating the skill component 190 needs further information in addition to what is represented in the received NLU hypothesis.

The post-NLU ranker 665 uses the result data 430 provided by the skill components 190 to alter the NLU processing confidence scores generated by the reranker component 490. That is, the post-NLU ranker 665 uses the result data 430 provided by the queried skill components 190 to create larger differences between the NLU processing confidence scores generated by the reranker component 490.

Without the post-NLU ranker 665, the system may not be confident enough to determine an output in response to a user input, for example when the NLU hypotheses associated with multiple skills are too close for the system to confidently determine a single skill component 190 to invoke to respond to the user input. For example, if the system does not implement the post-NLU ranker 665, the system may not be able to determine whether to obtain output data from a general reference information skill or a medical information skill in response to a user input corresponding to "what is acne."

The post-NLU ranker 665 may prefer skills 190 that provide result data 430 responsive to NLU hypotheses over skill components 190 that provide result data 430 corresponding to an indication that further information is needed, as well as skill components 190 that provide result data 430 indicating they can provide multiple responses to received NLU hypotheses. For example, the post-NLU ranker 665 may generate a first score for a first skill component 190a that is greater than the first skill component's NLU confidence score based on the first skill component 190a providing result data 430a including a response to a NLU hypothesis. For further example, the post-NLU ranker 665 may generate a second score for a second skill component 190b that is less than the second skill's NLU confidence score based on the second skill component 190b providing result data 430b indicating further information is needed for the second skill component 190b to provide a response to a NLU hypothesis. Yet further, for example, the post-NLU ranker 665 may generate a third score for a third skill component 190c that is less than the third skill's NLU confidence score based on the third skill component 190c providing result data 430c indicating the third skill component 190c can provide multiple responses to a NLU hypothesis.

The post-NLU ranker 665 may consider other data 420 in determining scores. The other data 420 may include rankings associated with the queried skill components 190. A ranking may be a system ranking or a user-specific ranking. A ranking may indicate a veracity of a skill from the perspective of one or more users of the system. For example, the post-NLU ranker 665 may generate a first score for a first skill component 190a that is greater than the first skill component's NLU processing confidence score based on the first skill component 190a being associated with a high ranking. For further example, the post-NLU ranker 665 may generate a second score for a second skill component 190b that is less than the second skill's NLU processing confidence score based on the second skill component 190b being associated with a low ranking.

The other data 420 may include information indicating whether or not the user that originated the user input has enabled one or more of the queried skill components 190. For example, the post-NLU ranker 665 may generate a first score for a first skill component 190a that is greater than the first skill's NLU processing confidence score based on the first skill component 190a being enabled by the user that originated the user input. For further example, the post-NLU ranker 665 may generate a second score for a second skill component 190b that is less than the second skill's NLU processing confidence score based on the second skill component 190b not being enabled by the user that originated the user input. When the post-NLU ranker 665 receives the NLU output data 185, the post-NLU ranker 665 may determine whether profile data, associated with the user and/or device that originated the user input, includes indications of enabled skills.

The other data 420 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 665 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 665 may increase the NLU processing confidence score associated with a first skill configured to output visual data and/or decrease the NLU processing confidence score associated with a second skill configured to output audio data.

The other data 420 may include information indicating the veracity of the result data 430 provided by a skill component 190. For example, if a user says "tell me a recipe for pasta sauce," a first skill component 190a may provide the post-NLU ranker 665 with first result data 430a corresponding to a first recipe associated with a five star rating and a second skill component 190b may provide the post-NLU ranker 665 with second result data 430b corresponding to a second recipe associated with a one star rating. In this situation, the post-NLU ranker 665 may increase the NLU processing confidence score associated with the first skill component 190a based on the first skill component 190a providing the first result data 430a associated with the five star rating and/or decrease the NLU processing confidence score associated with the second skill component 190b based on the second skill component 190b providing the second result data 430b associated with the one star rating.

The other data 420 may include information indicating the type of device that originated the user input. For example, the device may correspond to a "hotel room" type if the device is located in a hotel room. If a user inputs a command corresponding to "order me food" to the device located in the hotel room, the post-NLU ranker 665 may increase the NLU processing confidence score associated with a first skill 190a corresponding to a room service skill associated with the hotel and/or decrease the NLU processing confidence score associated with a second skill component 190b corresponding to a food skill not associated with the hotel.

The other data 420 may include information indicating a location of the device and/or user that originated the user input. The system may be configured with skill components 190 that may only operate with respect to certain geographic locations. For example, a user may provide a user input corresponding to "when is the next train to Portland." A first skill component 190a may operate with respect to trains that arrive at, depart from, and pass through Portland, Oregon. A second skill component 190b may operate with respect to trains that arrive at, depart from, and pass through Portland, Maine. If the device and/or user that originated the user input is located in Seattle, Washington, the post-NLU ranker 665 may increase the NLU processing confidence score associated with the first skill component 190a and/or decrease the NLU processing confidence score associated with the second skill component 190b. Likewise, if the device and/or user that originated the user input is located in Boston, Massachusetts, the post-NLU ranker 665 may increase the NLU processing confidence score associated with the second skill component 190b and/or decrease the NLU processing confidence score associated with the first skill component 190a.

The other data 420 may include information indicating a time of day. The system may be configured with skill components 190 that operate with respect to certain times of day. For example, a user may provide a user input corresponding to "order me food." A first skill component 190a may generate first result data 430a corresponding to breakfast. A second skill component 190b may generate second result data 430b corresponding to dinner. If the system component(s) 120 receives the user input in the morning, the post-NLU ranker 665 may increase the NLU processing confidence score associated with the first skill component 190a and/or decrease the NLU processing score associated with the second skill component 190b. If the system component(s) 120 receives the user input in the afternoon or evening, the post-NLU ranker 665 may increase the NLU processing confidence score associated with the second skill component 190b and/or decrease the NLU processing confidence score associated with the first component skill 190a.

The other data 420 may include information indicating user preferences. The system may include multiple skill components 190 configured to execute in substantially the same manner. For example, a first skill component 190a and a second skill component 190b may both be configured to order food from respective restaurants. The system may store a user preference (e.g., in the profile storage 670) that is associated with the user that provided the user input to the system component(s) 120 as well as indicates the user prefers the first skill component 190a over the second skill component 190b. Thus, when the user provides a user input that may be executed by both the first skill component 190a and the second skill component 190b, the post-NLU ranker 665 may increase the NLU processing confidence score associated with the first skill component 190a and/or decrease the NLU processing confidence score associated with the second skill component 190b.

The other data 420 may include information indicating system usage history associated with the user that originated the user input. For example, the system usage history may indicate the user originates user inputs that invoke a first skill component 190a more often than the user originates user inputs that invoke a second skill component 190b. Based on this, if the present user input may be executed by both the first skill component 190a and the second skill component 190b, the post-NLU ranker 665 may increase the NLU processing confidence score associated with the first skill component 190a and/or decrease the NLU processing confidence score associated with the second skill component 190b.

The other data 420 may include information indicating a speed at which the user device 110 that originated the user input is traveling. For example, the user device 110 may be located in a moving vehicle, or may be a moving vehicle. When a user device 110 is in motion, the system may prefer audio outputs rather than visual outputs to decrease the likelihood of distracting the user (e.g., a driver of a vehicle). Thus, for example, if the user device 110 that originated the user input is moving at or above a threshold speed (e.g., a speed above an average user's walking speed), the post-NLU ranker 665 may increase the NLU processing confidence score associated with a first skill component 190a that generates audio data. The post-NLU ranker 665 may also or alternatively decrease the NLU processing confidence score associated with a second skill component 190b that generates image data or video data.

The other data 420 may include information indicating how long it took a skill component 190 to provide result data 430 to the post-NLU ranker 665. When the post-NLU ranker 665 multiple skill components 190 for result data 430, the skill components 190 may respond to the queries at different speeds. The post-NLU ranker 665 may implement a latency budget. For example, if the post-NLU ranker 665 determines a skill component 190 responds to the post-NLU ranker 665 within a threshold amount of time from receiving a query from the post-NLU ranker 665, the post-NLU ranker 665 may increase the NLU processing confidence score associated with the skill component 190. Conversely, if the post-NLU ranker 665 determines a skill component 190 does not respond to the post-NLU ranker 665 within a threshold amount of time from receiving a query from the post-NLU ranker 665, the post-NLU ranker 665 may decrease the NLU processing confidence score associated with the skill component 190.

It has been described that the post-NLU ranker 665 uses the other data 420 to increase and decrease NLU processing confidence scores associated with various skill components 190 that the post-NLU ranker 665 has already requested result data from. Alternatively, the post-NLU ranker 665 may use the other data 420 to determine which skill components 190 to request result data from. For example, the post-NLU ranker 665 may use the other data 420 to increase and/or decrease NLU processing confidence scores associated with skill components 190 associated with the NLU output data 185 output by the NLU component 180. The post-NLU ranker 665 may select n-number of top scoring altered NLU processing confidence scores. The post-NLU ranker 665 may then request result data 430 from only the skill components 190 associated with the selected n-number of NLU processing confidence scores.

As described, the post-NLU ranker 665 may request result data 430 from all skill components 190 associated with the NLU output data 185 output by the NLU component 180. Alternatively, the system component(s) 120 may prefer result data 430 from skills implemented entirely by the system component(s) 120 rather than skill components at least partially implemented by the skill system component(s) 125. Therefore, in the first instance, the post-NLU ranker 665 may request result data 430 from only skill components associated with the NLU output data 185 and entirely implemented by the system component(s) 120. The post-NLU ranker 665 may only request result data 430 from skill components associated with the NLU output data 185, and at least partially implemented by the skill system component(s) 125, if none of the skill components, wholly implemented by the system component(s) 120, provide the post-NLU ranker 665 with result data 430 indicating either data response to the NLU output data 185, an indication that the skill component can execute the user input, or an indication that further information is needed.

As indicated above, the post-NLU ranker 665 may request result data 430 from multiple skill components 190. If one of the skill components 190 provides result data 430 indicating a response to a NLU hypothesis and the other skills provide result data 430 indicating either they cannot execute or they need further information, the post-NLU ranker 665 may select the result data 430 including the response to the NLU hypothesis as the data to be output to the user. If more than one of the skill components 190 provides result data 430 indicating responses to NLU hypotheses, the post-NLU ranker 665 may consider the other data 420 to generate altered NLU processing confidence scores, and select the result data 430 of the skill associated with the greatest score as the data to be output to the user.

A system that does not implement the post-NLU ranker 665 may select the highest scored NLU hypothesis in the NLU output data 185. The system may send the NLU hypothesis to a skill component 190 associated therewith along with a request for output data. In some situations, the skill component 190 may not be able to provide the system with output data. This results in the system indicating to the user that the user input could not be processed even though another skill associated with lower ranked NLU hypothesis could have provided output data responsive to the user input.

The post-NLU ranker 665 reduces instances of the aforementioned situation. As described, the post-NLU ranker 665 queries multiple skills associated with the NLU output data 185 to provide result data 430 to the post-NLU ranker 665 prior to the post-NLU ranker 665 ultimately determining the skill component 190 to be invoked to respond to the user input. Some of the skill components 190 may provide result data 430 indicating responses to NLU hypotheses while other skill components 190 may providing result data 430 indicating the skills cannot provide responsive data. Whereas a system not implementing the post-NLU ranker 665 may select one of the skill components 190 that could not provide a response, the post-NLU ranker 665 only selects a skill component 190 that provides the post-NLU ranker 665 with result data corresponding to a response, indicating further information is needed, or indicating multiple responses can be generated.

The post-NLU ranker 665 may select result data 430, associated with the skill component 190 associated with the highest score, for output to the user. Alternatively, the post-NLU ranker 665 may output ranked output data indicating skill components 190 and their respective post-NLU ranker rankings. Since the post-NLU ranker 665 receives result data 430, potentially corresponding to a response to the user input, from the skill components 190 prior to post-NLU ranker 665 selecting one of the skills or outputting the ranked output data, little to no latency occurs from the time skills provide result data 430 and the time the system outputs responds to the user.

If the post-NLU ranker 665 selects result audio data to be output to a user and the system determines content should be output audibly, the post-NLU ranker 665 (or another component of the system component(s) 120) may cause the user device 110a and/or the user device 110b to output audio corresponding to the result audio data. If the post-NLU ranker 665 selects result text data to output to a user and the system determines content should be output visually, the post-NLU ranker 665 (or another component of the system component(s) 120) may cause the user device 110b to display text corresponding to the result text data. If the post-NLU ranker 665 selects result audio data to output to a user and the system determines content should be output visually, the post-NLU ranker 665 (or another component of the system component(s) 120) may send the result audio data to the ASR component 140. The ASR component 140 may generate output text data corresponding to the result audio data. The system component(s) 120 may then cause the user device 110b to display text corresponding to the output text data. If the post-NLU ranker 665 selects result text data to output to a user and the system determines content should be output audibly, the post-NLU ranker 665 (or another component of the system component(s) 120) may send the result text data to the TTS component 680. The TTS component 680 may generate output audio data (corresponding to computer-generated speech) based on the result text data. The system component(s) 120 may then cause the user device 110*a* and/or the user device 110*b* to output audio corresponding to the output audio data.

As described, a skill component 190 may provide result data 430 either indicating a response to the user input, indicating more information is needed for the skill component 190 to provide a response to the user input, or indicating the skill component 190 cannot provide a response to the user input. If the skill component 190 associated with the highest post-NLU ranker score provides the post-NLU ranker 665 with result data 430 indicating a response to the user input, the post-NLU ranker 665 (or another component of the system component(s) 120, such as the orchestrator component 130) may simply cause content corresponding to the result data 430 to be output to the user. For example, the post-NLU ranker 665 may send the result data 430 to the orchestrator component 130. The orchestrator component 130 may cause the result data 430 to be sent to the device (110*a*/110*b*), which may output audio and/or display text corresponding to the result data 430. The orchestrator component 130 may send the result data 430 to the ASR component 140 to generate output text data and/or may send the result data 430 to the TTS component 680 to generate output audio data, depending on the situation.

The skill component 190 associated with the highest post-NLU ranker score may provide the post-NLU ranker 665 with result data 430 indicating more information is needed as well as instruction data. The instruction data may indicate how the skill component 190 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110*a*/110*b*). When this occurs, the post-NLU ranker 665 may simply cause the received instruction data be output by the device (110*a*/110*b*). Alternatively, the instruction data may be in a format that is not capable of being output by the device (110*a*/110*b*). When this occurs, the post-NLU ranker 665 may cause the ASR component 140 or the TTS component 680 to process the instruction data, depending on the situation, to generate instruction data that may be output by the device (110*a*/110*b*). Once the user provides the system with all further information needed by the skill component 190, the skill component 190 may provide the system with result data 430 indicating a response to the user input, which may be output by the system as detailed above.

The system may include "informational" skill components 190 that simply provide the system with information, which the system outputs to the user. The system may also include "transactional" skill components 190 that require a system instruction to execute the user input. Transactional skill components 190 include ride sharing skills, flight booking skills, etc. A transactional skill component 190 may simply provide the post-NLU ranker 665 with result data 430 indicating the transactional skill component 190 can execute the user input. The post-NLU ranker 665 may then cause the system to solicit the user for an indication that the system is permitted to cause the transactional skill component 190 to execute the user input. The user-provided indication may be an audible indication or a tactile indication (e.g., activation of a virtual button or input of text via a virtual keyboard). In response to receiving the user-provided indication, the system may provide the transactional skill component 190 with data corresponding to the indication. In response, the transactional skill component 190 may execute the command (e.g., book a flight, book a train ticket, etc.). Thus, while the system may not further engage an informational skill component 190 after the informational skill component 190 provides the post-NLU ranker 665 with result data 430, the system may further engage a transactional skill component 190 after the transactional skill component 190 provides the post-NLU ranker 665 with result data 430 indicating the transactional skill component 190 may execute the user input.

In some instances, the post-NLU ranker 665 may generate respective scores for first and second skills that are too close (e.g., are not different by at least a threshold difference) for the post-NLU ranker 665 to make a confident determination regarding which skill should execute the user input. When this occurs, the system may request the user indicate which skill the user prefers to execute the user input. The system may output TTS-generated speech to the user to solicit which skill the user wants to execute the user input.

One or more models implemented by components of the orchestrator component 130, post-NLU ranker 665, shortlister component 350, or other component may be trained and operated according to various machine learning techniques.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 8:
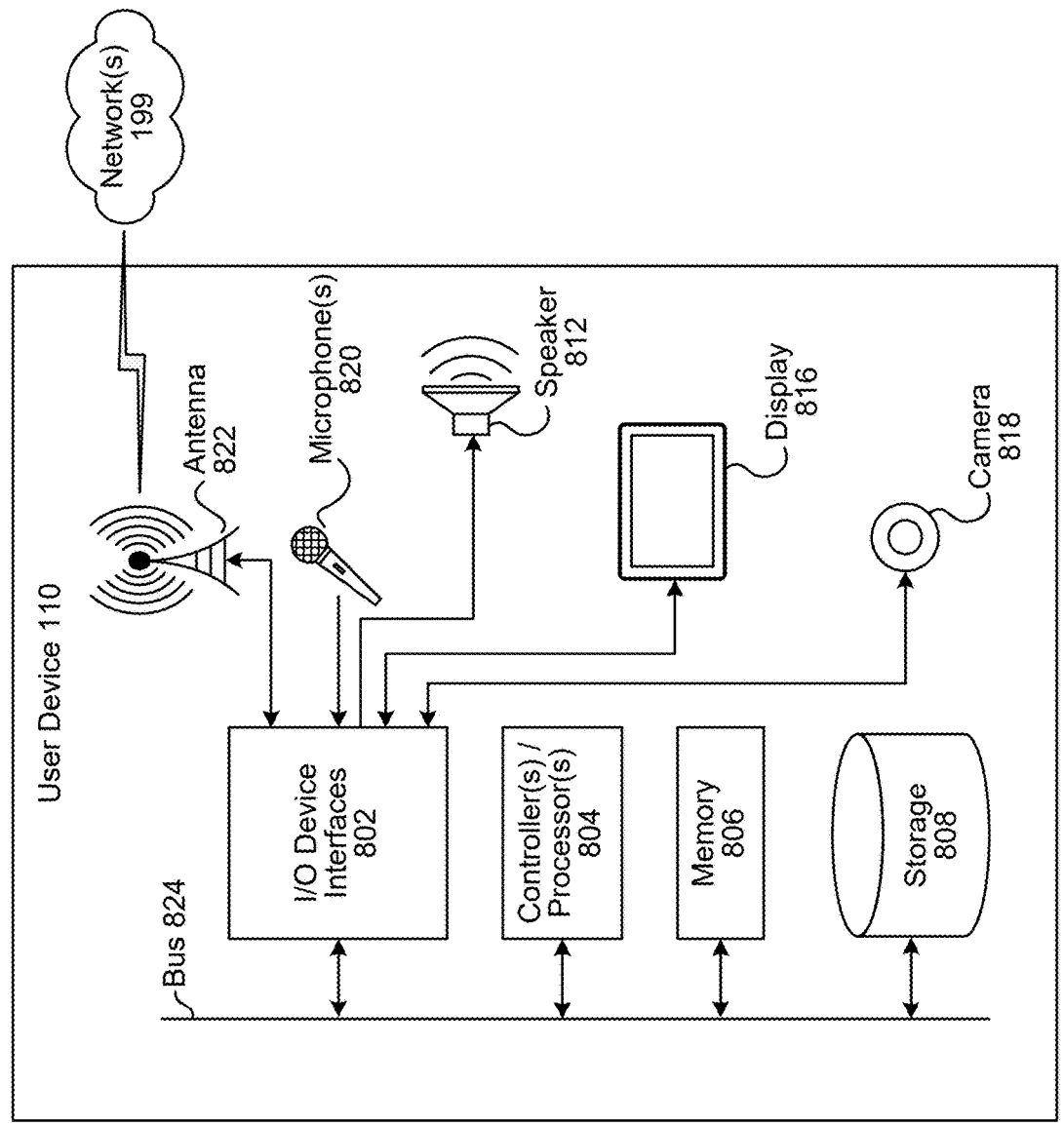
FIG. 8 is a block diagram conceptually illustrating example components of a device, according to embodiments of the present disclosure.
Figure 9:
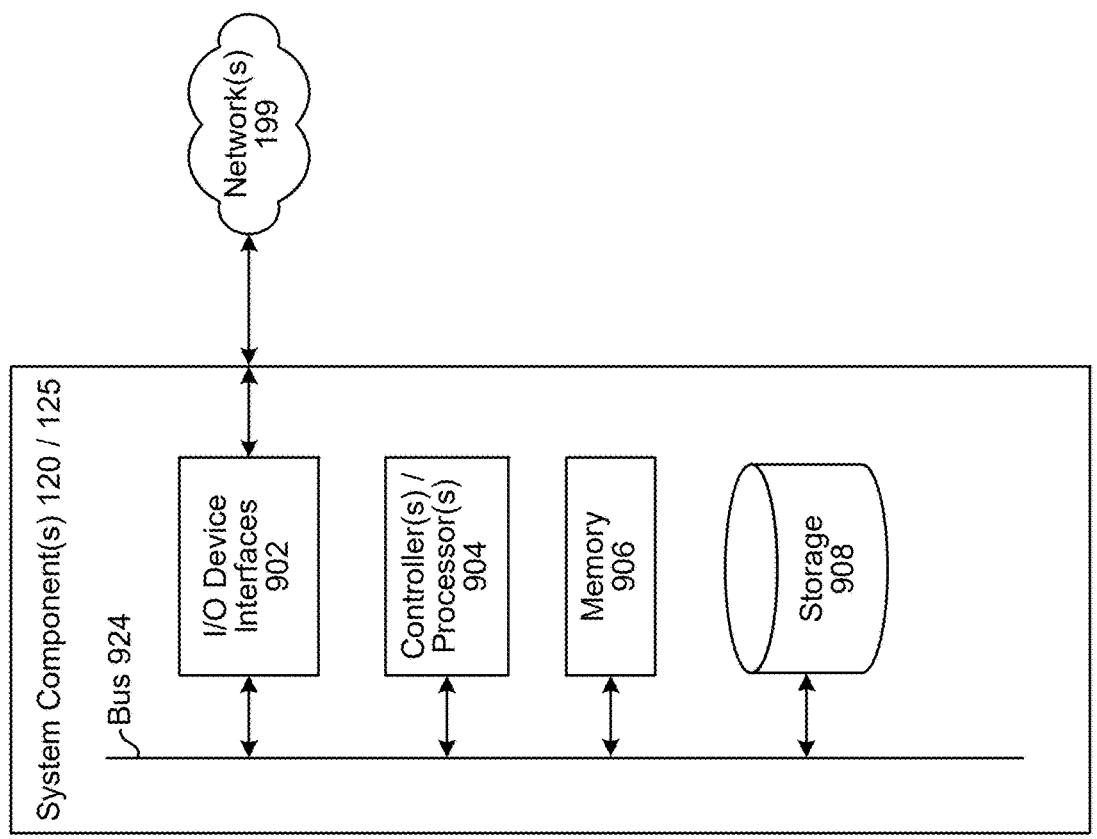
FIG. 9 is a block diagram conceptually illustrating example components of a system, according to embodiments of the present disclosure.

FIG. 8 is a block diagram conceptually illustrating a user device 110 that may be used with the system. FIG. 9 is a block diagram conceptually illustrating example components of a remote device, such as the natural language command processing system component(s) 120, which may assist with ASR processing, NLU processing, etc., and a skill system component(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 110 may operate locally to a user (e.g., within a same environment so the device may receive inputs and playback outputs for the user) the server/system component(s) 120 may be located remotely from the user device 110 as its operations may not require proximity to the user. The server/system component(s) 120 may be located in an entirely different location from the user device 110 (for example, as part of a cloud computing system or the like) or may be located in a same environment as the user device 110 but physically separated therefrom (for example a home server or similar device that resides in a user's home or business but perhaps in a closet, basement, attic, or the like). The system component(s) 120 may also be a version of a user device 110 that includes different (e.g., more) processing capabilities than other user device(s) 110 in a home/office. One benefit to the server/system component(s) 120 being in a user's home/business is that data used to process a command/return a response may be kept within the user's home, thus reducing potential privacy concerns.

Multiple systems (120/125) may be included in the overall system 100 of the present disclosure, such as one or more system components 120 for performing ASR processing, one or more system components 120 for performing NLU processing, one or more skill system components 125, etc. In operation, each of these systems may include computer-readable and computer-executable instructions that reside on the respective device (120/125), as will be discussed further below.

Each of these devices (110/120/125) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/125) may also include a data storage component (808/908) for storing data and controller/processor-executable instructions. Each data storage component (808/908) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (802/902).

Computer instructions for operating each device (110/120/125) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/125) includes input/output device interfaces (802/902). A variety of components may be connected through the input/output device interfaces (802/902), as will be discussed further below. Additionally, each device (110/120/125) may include an address/data bus (824/924) for conveying data among components of the respective device. Each component within a device (110/120/125) may also be directly connected to other components in addition to (or instead of) being connected to other components across the bus (824/924).

Referring to FIG. 8, the user device 110 may include input/output device interfaces 802 that connect to a variety of components such as an audio output component such as a speaker 812, a wired headset or a wireless headset (not illustrated), or other component capable of outputting audio. The user device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 816 for displaying content. The user device 110 may further include a camera 818.

Via antenna(s) 822, the input/output device interfaces 802 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 110, the natural language command processing system component(s) 120, or a skill system component(s) 125 may include their own dedicated processors, memory, and/or storage. Alternatively, one or more of the components of the device(s) 110, the natural language command processing system component(s) 120, or a skill system component(s) 125 may utilize the I/O interfaces (802/902), processor(s) (804/904), memory (806/906), and/or storage (808/908) of the device(s) 110, natural language command processing system component(s) 120, or the skill system component(s) 125, respectively. Thus, the ASR component 140 may have its own I/O interface(s), processor(s), memory, and/or storage; the NLU component 180 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 110, the natural language command processing system component(s) 120, and a skill system component(s) 125, as described herein, are illustrative, and may be located as a stand-alone device or may be included, in whole or in part, as a component of a larger device or system. As can be appreciated, a number of components may exist either on a system component(s) 120 and/or on user device 110. For example, language processing 692/792 (which may include ASR 140/750), language output 693/793 (which may include NLG 679/779 and TTS 680/780), etc., for example as illustrated in FIGS. 6 and 7. Unless expressly noted otherwise, the system version of such components may operate similarly to the device version of such components and thus the description of one version (e.g., the system version or the local version) applies to the description of the other version (e.g., the local version or system version) and vice-versa.

Figure 10:
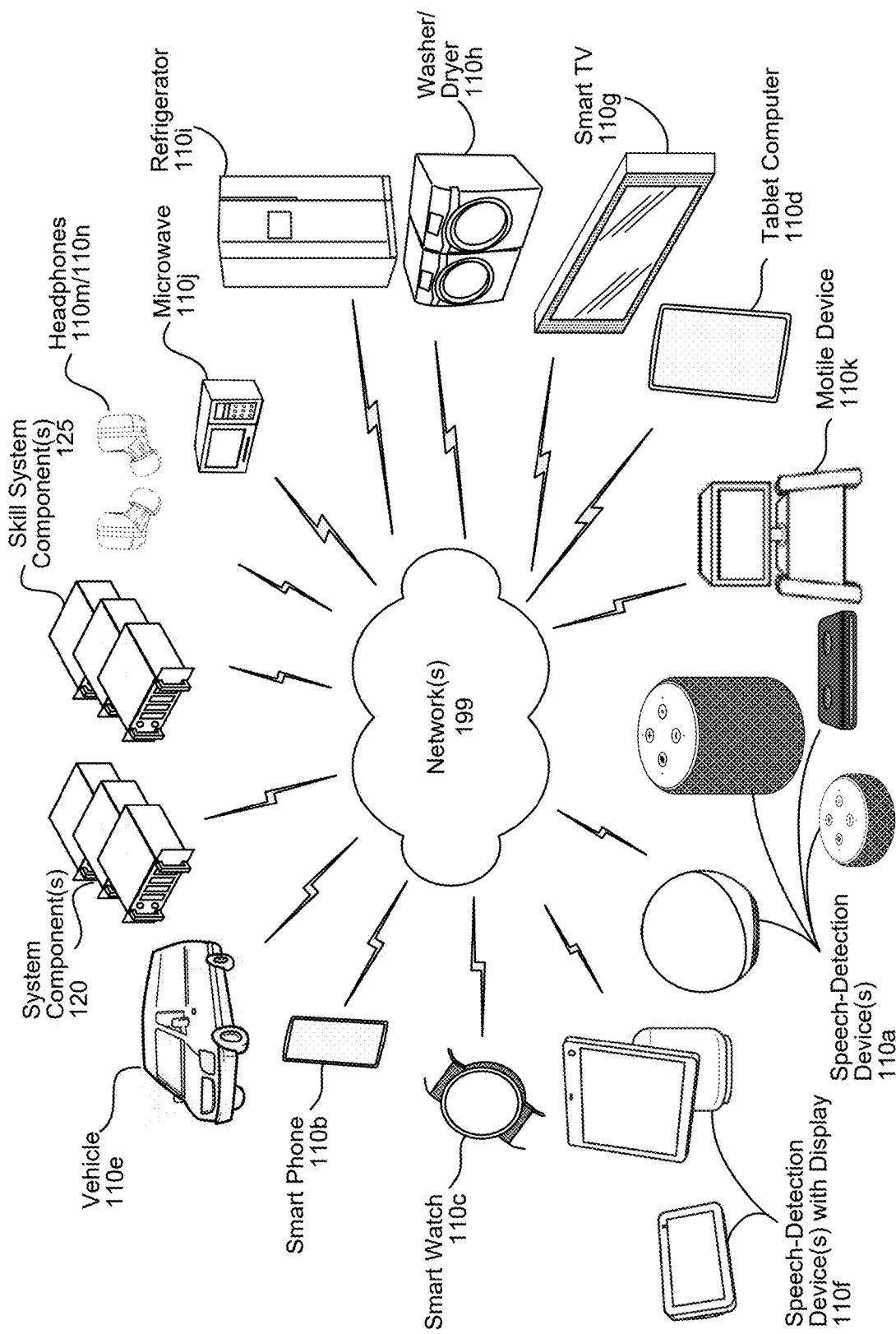
FIG. 10 illustrates an example of a computer network for use with the overall system, according to embodiments of the present disclosure.

As illustrated in FIG. 10, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection user device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile device 110k (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 140, the NLU component 180, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
 causing a first image to be displayed;
 storing first data associating the first image with a first device identifier of a first device;
 after causing the first image to be displayed, receiving, from the first device, first input audio data representing a first spoken input;
 performing automatic speech recognition (ASR) processing using the first input audio data to generate ASR output data including a first transcript of the first spoken input;
 receiving, from the first device, second input audio data representing a second spoken input;

performing ASR processing using the second input audio data to generate second ASR output data including a second transcript of the second spoken input;

based on the first data, the first input audio data, and the second input audio data being received from the first device, determining first embedding data associated with the first image, the first embedding data representing at least one feature of the first image;

processing, using an encoder, the second ASR output data to generate second embedding data representing at least one feature of the second spoken input;

using a first machine learning (ML) component, processing the ASR output data and the first embedding data to determine a first similarity between the ASR output data and the first embedding data, wherein the first similarity represents a likelihood that the first spoken input is requesting performance of an action with respect to the first image;

determining, based on the first similarity, that the first spoken input relates to the first image;

based on determining that the first spoken input relates to the first image, performing a first action responsive to the first spoken input;

using a second ML component, processing the first embedding data and the second embedding data to determine that the second spoken input is associated with the first image; and based on determining that the second spoken input is associated with the first image, performing a second action responsive to the second spoken input.

2. The computer-implemented method of claim 1, further comprising:

prior to receiving the first input audio data, receiving, from the first device, the second input audio data representing the second spoken input;

performing natural language understanding (NLU) processing using the second ASR output data to generate NLU output data including at least an intent corresponding to the second spoken input;

based on the NLU output data, determining the first image, the first image being responsive to the second spoken input; and ceasing display of the first image, wherein the first input audio data is received after ceasing display of the first image.

3. The computer-implemented method of claim 1, further comprising:

using the second ML component, processing the first embedding data and the second embedding data to determine a second similarity between the first embedding data and the second embedding data, wherein the second similarity represents a likelihood that the second embedding data is requesting performance of a second action with respect to the first image.

4. The computer-implemented method of claim 1, further comprising:

prior to receiving the first input audio data, causing a second image to be displayed, wherein the first data is further stored to associate the second image with the first device identifier;

based on the first data and the first input audio data being received from the first device, determining third embedding data associated with the second image, wherein the third embedding data represents at least one feature of the second image;

using the first ML component, processing the third embedding data to determine a third similarity between the ASR output data and the third embedding data; and determining, based on the first similarity and the third similarity, that the first spoken input relates to the first image instead of the second image.

5. A computer-implemented method comprising:

receiving a first representation of a first natural language user input;

determining first content data that was displayed prior to receiving the first representation of the first natural language user input;

determining first embedding data associated with the first content data, the first embedding data representing at least one feature of the first content data;

using the first embedding data, determining that the first natural language user input refers to the first content data;

based on determining that the first natural language user input refers to the first content data, performing a first action responsive to the first natural language user input;

receiving a second representation of a second natural language user input;

determining second embedding data representing at least one feature of the second natural language user input;

processing, using a machine learning (ML) component, the first embedding data and the second embedding data to determine the second natural language user input is associated with the first content data; and based on determining that the second natural language user input is associated with the first content data, performing a second action responsive to the second natural language user input.

6. The computer-implemented method of claim 5, further comprising:

processing, using an encoder, the second representation of the second natural language user input to generate the second embedding data representing the at least one feature of the second natural language user input;

processing, using the ML component, the first embedding data and the second embedding data to determine a similarity between the first embedding data and the second embedding data, determining the similarity represents a likelihood that the second embedding data is requesting performance of the second action with respect to the first content data; and determining, based on the similarity, that the second natural language user input relates to the first content data.

7. The computer-implemented method of claim 5, further comprising:

determining an object represented in the first content data;

determining second content data including a third representation of the object; and based on the second content data including the third representation of the object, determining that the second content data is to be displayed in response to the first natural language user input.

8. The computer-implemented method of claim 5, further comprising:

determining second content data that was displayed prior to receiving the first representation of the first natural language user input, wherein the first content data and the second content data are determined based on first data associating the first content data and the second content data with a first device, and the first natural language user input being received from the first device;
determining third embedding data associated with the second content data, the third embedding data representing at least one feature of the second content data;
processing, using the machine learning (ML) component, the first representation of the first natural language user input and the first embedding data to determine a first similarity;
processing, using the ML component, the first representation of the first natural language user input and the third embedding data to determine a second similarity; and
based on the first similarity and the second similarity, determining that the first natural language user input relates to the first content data instead of the second content data.

9. The computer-implemented method of claim 8, further comprising:
based on determining that the first natural language user input refers to the first content data instead of the second content data, generating natural language understanding (NLU) output data including at least a first NLU hypothesis associated with the first embedding data and the third embedding data.

10. The computer-implemented method of claim 5, further comprising:
determining the first embedding data represents at least one of a color or a position of an object represented in the first content data.

11. The computer-implemented method of claim 5, further comprising:
determining a first automatic speech recognition (ASR) hypothesis including a first transcript of the first natural language user input; and
using a machine learning (ML) component, processing the first ASR hypothesis and the first embedding data to determine a second ASR hypothesis including a second transcript of the first natural language user input.

12. The computer-implemented method of claim 5, wherein:
the first content data is video data, and
the first embedding data corresponds to a first frame of the video data.

13. A computing system comprising:
at least one processor; and
at least one memory comprising instructions that, when executed by the at least one processor, cause the computing system to:
receive a first representation of a first natural language user input;
determine first content data that was displayed prior to receiving the first representation of the first natural language user input;
determine first embedding data associated with the first content data, the first embedding data representing at least one feature of the first content data;
use the first embedding data, determining that the first natural language user input refers to the first content data;
based on determining that the first natural language user input refers to the first content data, perform a first action responsive to the first natural language user input;
receive a second representation of a second natural language user input;
determine second embedding data representing at least one feature of the second natural language user input;
process, using a machine learning (ML) component, the first embedding data and the second embedding data to determine the second natural language user input is associated with the first content data; and
based on determination that the second natural language user input is associated with the first content data, perform a second action responsive to the second natural language user input.

14. The computing system of claim 13, further comprising:
process, using an encoder, the second representation of the second natural language user input to generate the second embedding data representing at least one feature of the second natural language user input;
process, using the ML component, the first embedding data and the second embedding data to determine a similarity between the first embedding data and the second embedding data,
determine the similarity represents a likelihood that the second embedding data is requesting performance of the second action with respect to the first content data; and
determine, based on the similarity, that the second natural language user input relates to the first content data.

15. The computing system of claim 13, wherein the at least one memory further comprises instructions that, when executed by the at least one processor, further cause the computing system to:
determine an object represented in the first content data;
determine second content data including a third representation of the object; and
based on the second content data including the third representation of the object, determine that the second content data is to be displayed in response to the first natural language user input.

16. The computing system of claim 13, wherein the at least one memory further comprises instructions that, when executed by the at least one processor, further cause the computing system to:
determine second content data that was displayed prior to receiving the first representation of the first natural language user input, wherein the first content data and the second content data are determined based on first data associating the first content data and the second content data with a first device, and the first natural language user input being received from the first device;
determine third embedding data associated with the second content data, the third embedding data representing at least one feature of the second content data;
process, using the ML component, the first representation of the first natural language user input and the first embedding data to determine a first similarity;
process, using the ML component, the first representation of the first natural language user input and the third embedding data to determine a second similarity; and
based on the first similarity and the second similarity, determine that the first natural language user input relates to the first content data instead of the second content data.

17. The computing system of claim 16, wherein the at least one memory further comprises instructions that, when executed by the at least one processor, further cause the computing system to:

based on determining that the first natural language user input refers to the first content data instead of the second content data, generate natural language understanding (NLU) output data including at least a first NLU hypothesis associated with the first embedding data and the third embedding data.

18. The computing system of claim 13, wherein the at least one memory further comprises instructions that, when executed by the at least one processor, further cause the computing system to:
determine the first embedding data represents at least one of a color or a position of an object represented in the first content data.

19. The computing system of claim 13, wherein the at least one memory further comprises instructions that, when executed by the at least one processor, further cause the computing system to:
determine a first automatic speech recognition (ASR) hypothesis including a first transcript of the first natural language user input; and
process, using a machine learning (ML) component, the first ASR hypothesis and the first embedding data to determine a second ASR hypothesis including a second transcript of the first natural language user input.

20. The computing system of claim 13, wherein:
the first content data is video data, and
the first embedding data corresponds to a first frame of the video data.

* * * * *